US011182930B2

(12) United States Patent
Ben-Asher et al.

(10) Patent No.: US 11,182,930 B2
(45) Date of Patent: Nov. 23, 2021

(54) HEAD TRACKING WITH ADAPTIVE REFERENCE

(71) Applicant: WAVES AUDIO LTD., Tel Aviv (IL)

(72) Inventors: Matan Ben-Asher, Yahud (IL); Meir Shashoua, Tel Aviv (IL); Gal Alchanati, Ra'anana (IL); Nadav Nehoran, Tracy, CA (US)

(73) Assignee: WAVES AUDIO LTD., Tel Aviv (IL)

( * ) Notice: Subject to any disclaimer, the term of this patent is extended or adjusted under 35 U.S.C. 154(b) by 0 days.

(21) Appl. No.: 16/884,477

(22) Filed: May 27, 2020

(65) Prior Publication Data

US 2020/0294275 A1 Sep. 17, 2020

Related U.S. Application Data

(63) Continuation-in-part of application No. 16/096,986, filed as application No. PCT/IL2017/050484 on May 1, 2017, now Pat. No. 10,705,338.

(60) Provisional application No. 62/330,267, filed on May 2, 2016.

(51) Int. Cl.
  *G09G 5/00* (2006.01)
  *G06T 11/00* (2006.01)

(52) U.S. Cl.
  CPC .......... *G06T 11/00* (2013.01); *G06T 2200/24* (2013.01)

(58) Field of Classification Search
  None
  See application file for complete search history.

(56) References Cited

U.S. PATENT DOCUMENTS

| 5,742,264 A | 4/1998 | Inagaki et al. |
| 5,959,597 A | 9/1999 | Yamada et al. |
| 6,009,210 A * | 12/1999 | Kang ................. G06K 9/00228 345/156 |

(Continued)

FOREIGN PATENT DOCUMENTS

| JP | 2001-121000 A | 5/2001 |
| JP | 2001-208529 A | 8/2001 |

(Continued)

OTHER PUBLICATIONS

"Slerp," Wikipedia, [https://en.wikipedia.org/wiki/Slerp].

(Continued)

*Primary Examiner* — Nan-Ying Yang
(74) *Attorney, Agent, or Firm* — Oliff PLC

(57) ABSTRACT

A method and system of providing an adaptive reference orientation usable for determining a relative head orientation of a user, the method being implemented by a processing unit and comprising: repeatedly providing: receiving first data sensed by one or more sensors, said first data being indicative of a user's head orientation; obtaining a new adaptive reference orientation by moving a current adaptive reference orientation at least partly towards said indicated head orientation, by an amount which is varied at least partly in accordance with second data, said second data having been sensed by one or more sensors and being indicative of changes of a current frame of reference of the user; computing head orientation relative to said adaptive reference orientation; and using said new adaptive reference orientation as a current adaptive reference orientation for a next repeat of operations.

16 Claims, 16 Drawing Sheets

(56) References Cited

U.S. PATENT DOCUMENTS

| | | |
|---|---|---|
| 9,271,103 B2 | 2/2016 | Wells |
| 9,821,920 B2 | 11/2017 | Cole et al. |
| 2008/0170730 A1 | 7/2008 | Azizi et al. |
| 2009/0058606 A1 | 3/2009 | Munch et al. |
| 2009/0147993 A1 | 6/2009 | Hoffmann et al. |
| 2009/0189830 A1* | 7/2009 | Deering ............... H04N 13/383 345/1.3 |
| 2009/0219224 A1 | 9/2009 | Elg |
| 2011/0193883 A1 | 8/2011 | Palais et al. |
| 2011/0293129 A1 | 12/2011 | Dillen et al. |
| 2013/0236040 A1 | 9/2013 | Crawford et al. |
| 2014/0232637 A1 | 8/2014 | Park et al. |
| 2014/0354515 A1 | 12/2014 | LaValle et al. |
| 2016/0363992 A1 | 12/2016 | Welti |
| 2017/0050743 A1* | 2/2017 | Cole .................... G06F 1/1694 |
| 2017/0083084 A1 | 3/2017 | Tatsuta et al. |
| 2018/0081426 A1 | 3/2018 | Rothkopf |

FOREIGN PATENT DOCUMENTS

| | | |
|---|---|---|
| JP | 2012-518313 A | 8/2012 |
| WO | 16002318 A1 | 1/2016 |

OTHER PUBLICATIONS

"Quaternion," Wolfram MathWorld, [http://mathworld.wolfram.com/Quaternion.html].
"Quaternions and spatial rotation," Wikipedia, [https://en.wikipedia.org/wiki/Quaternions_and_spatial_rotation].
Blow, Jonathan, "Understanding Slerp, Then Not Using It," The Inner Product, Apr. 2004, [http://number-none.com/product/Understanding%20Slerp,%20Then%20Not%20Using%20It/].
Oct. 4, 2019 Office Action Issued in U.S. Appl. No. 16/096,986.
Feb. 28, 2020 Notice of Allowance Issued in U.S. Appl. No. 16/096,986.

* cited by examiner

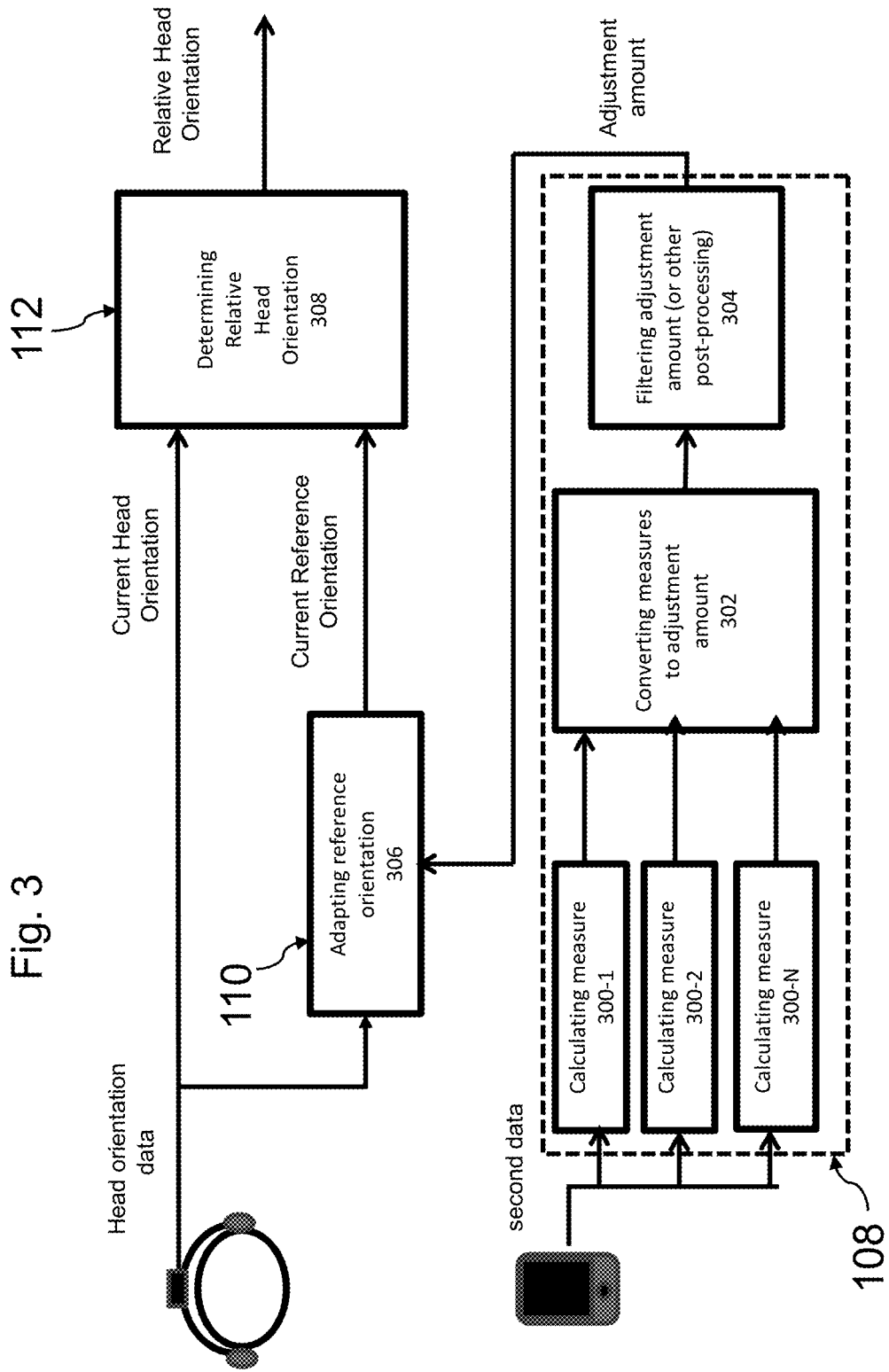

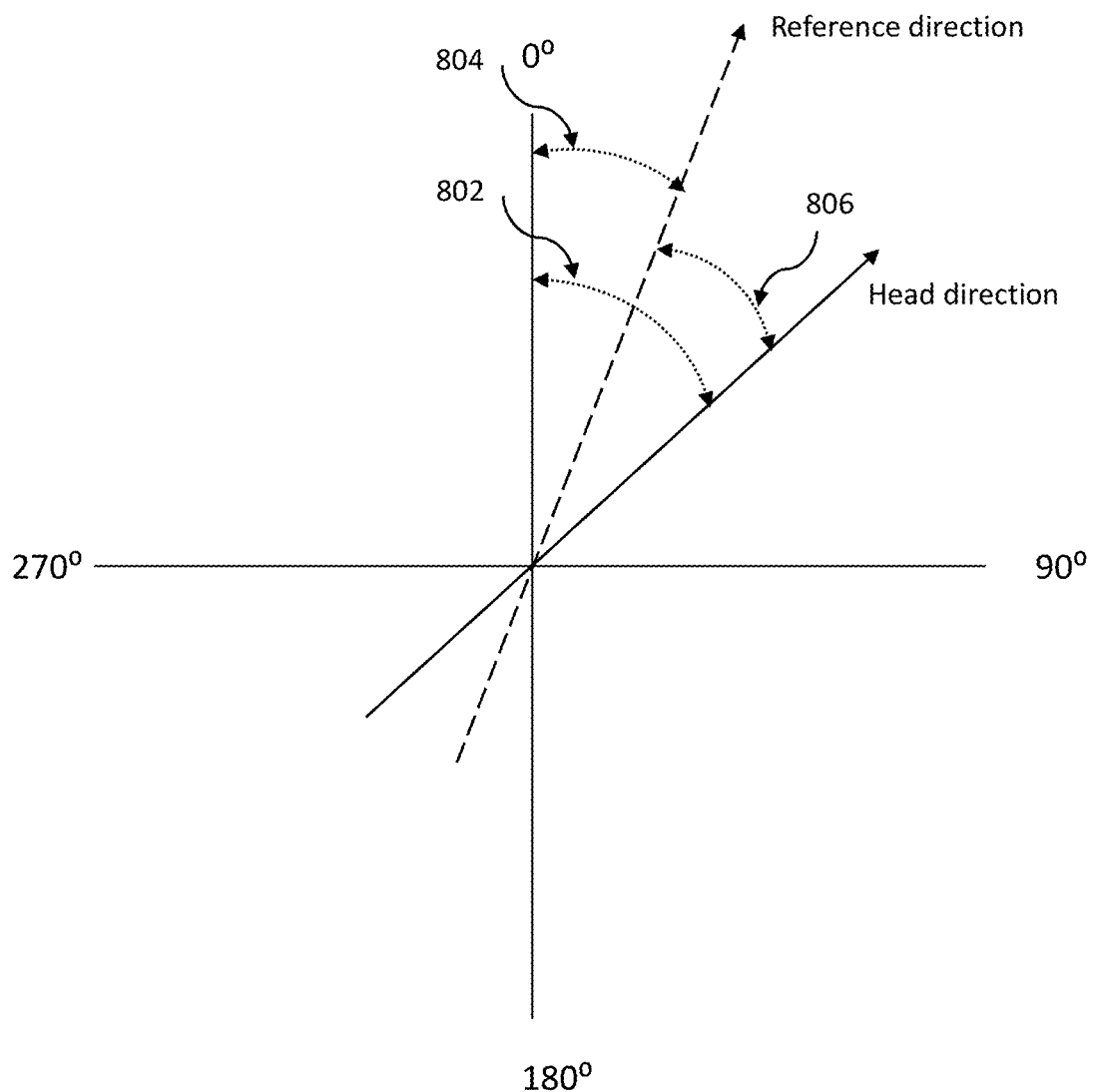

HEAD TRACKING WITH ADAPTIVE REFERENCE

CROSS-REFERENCES TO RELATED APPLICATIONS

The present application is a Continuation-in-Part application of U.S. patent application Ser. No. 16/096,986 filed on Oct. 26, 2018, which is a National Phase Application of PCT/IL2017/050484 filed on May 1, 2017, and which claims the benefit from U.S. Provisional Patent Application No. 62/330,267 filed on May 2, 2016, which is incorporated hereby by reference in its entirety.

TECHNICAL FIELD

The presently disclosed subject matter relates to head tracking and, more particularly, to head tracking in a non-static environment.

BACKGROUND

The positive and imperative effect of head tracking on simulating VR (Virtual Reality) or AR (Augmented Reality) or binaural audio rendering is a well-known phenomenon. In systems that implement such effects, head-tracking data is used in order to adjust the location of virtual objects (for example visual objects or sound sources) to a user's head movements in order to make them appear static in space rather than follow the user.

In a non-static environment, such as when the user is walking, riding a train, etc., the frame of reference of the user is constantly changing. In these situations, tracking head movements relative to a fixed reference becomes problematic and can lead to erroneous placement of virtual objects around the user.

Problems of head tracking in a non-static environment have been recognized in the conventional art and various techniques have been developed to provide solutions, for example:

United States Patent Publication No. US 2011/0293129 discloses a head tracking system that determines a rotation angle of a head of a user with respect to a reference direction, which is dependent on a movement of a user. Here the movement of a user should be understood as an act or process of moving including e.g. changes of place, position, or posture, such as e.g. lying down or sitting in a relaxation chair. The head tracking system according to the invention comprises a sensing device for measuring a head movement to provide a measure representing the head movement, and a processing circuit for deriving the rotation angle of the head of the user with respect to the reference direction from the measure. The reference direction used in the processing circuit is dependent on the movement of the user. The advantage of making the reference direction dependent on a movement of a user is that determining the rotation angle of the head is independent of the environment, i.e. not fixed to environment. Hence whenever the user is e.g. on the move and his body parts undergo movement the reference direction is adapted to this movement.

The reference(s) cited above teach background information that may be applicable to the presently disclosed subject matter. Therefore the full contents of these publications are incorporated by reference herein where appropriate for appropriate teachings of additional or alternative details, features and/or technical background.

General Description

In many cases of head tracking, the user's frame of reference also undergoes changes, for example in response to a change in the direction of linear motion of the user. For example, in a VR system for watching movies in airplane, simulating a cinema room with screen and speakers, and where the user is sitting. It is desired that the simulated cinema will remain stable relative to the user, rather than to the earth's 'north', such that when the airplane turns the cinema will remain in front of the user's eyes. Another example is listening to music with virtualized loudspeakers over headphones while walking and/or running. In this example it is desirable that the virtualized loudspeakers position will remain in front of the listener even when the user is turning a street corner.

The presently disclosed subject matter alleviates provides a method and system of head tracking for use in a non-static environment by adjusting the reference used for head tracking according to the movement of the user. Two or more inertial measurement units (IMU) or any other two or more sensors for acquiring location and/or movement and/or orientation data are used, in which at least one of the sensors is used for tracking orientation of the user's head, and at least another sensor is used for providing information indicating a possible need to adjust the frame of reference by which the head movements are tracked.

According to one aspect of the presently disclosed subject matter there is provided a system for providing head orientation relative to an adaptive reference orientation comprising a head sensor configured to provide head data describing a first head orientation associated with a user; one or more second sensors configured to provide second data; and a processing unit operatively coupled to the head sensor and the one or more second sensors and configured to: receive head data from the head sensor; receive second data from the one or more second sensors; adapt said adaptive reference orientation by moving it at least partly towards said first head orientation by an amount which is varied at least partly in accordance with said second data, thereby generating a new adaptive reference orientation; and generate, in accordance with said first head orientation and said new adaptive reference orientation, a second head orientation associated with the user as said first head orientation relative to said new adaptive reference orientation.

In addition to the above features, the system according to this aspect of the presently disclosed subject matter can comprise one or more of features (i) to (xii) listed below, in any desired combination or permutation which is technically possible:

(i) the amount is varied at least partly in accordance with changes in the statistical properties of said second data.

(ii) the adaptive reference orientation is adapted by rotating the adaptive reference orientation in accordance with an adjustment amount by interpolating between said adaptive reference orientation and said first head orientation. Interpolating can be performed using a quaternion spherical linear interpolation ("Slerp") operation.

(iii) the second data can be used to compute or derive the adjustment amount by computing one or more measures based on the second data, and converting the one or more measures to the adjustment amount.

(iv) the one or more measures can be converted to the adjustment amount by comparing one or more of the one or more measures to one or more respective thresholds.

(v) the one or more measures can include one or more of relative stability, relative deviation, and/or absolute deviation.

(vi) the adjustment amount can be further processed for smoothing.

(viii) the adjustment amount can be further processed to control one or more of rise time, hold time, and decay time of the adjustment amount.

(ix) the second data includes data indicative of a need to change the adaptive reference orientation.

(x) the second data includes data indicative of at least one of: location, motion, orientation, velocity and acceleration associated with the user in at least one dimension of a three dimensional coordinate system.

(xi) binaural audio can be rendered in accordance with the second head orientation and delivered to headphones worn by the user.

(xii) at least one of virtual reality (VR) video and/or augmented reality (AR) video can be rendered in accordance with the second head orientation.

According to another aspect of the presently disclosed subject matter there is provided a computer implemented method of providing a head orientation relative to an adaptive reference orientation comprising, by a processing unit, receiving head data from a head sensor, the head data describing a first head orientation associated with a user; receiving second data from one or more second sensors; adapting the adaptive reference orientation by moving it at least partly towards said first head orientation by an amount which is varied at least partly in accordance with said second data, thereby generating a new adaptive reference orientation; and generating, in accordance with said first head orientation and said new adaptive reference orientation, a second head orientation associated with the user as said first head orientation relative to said new adaptive reference orientation.

This aspect of the disclosed subject matter can comprise one or more of features (i) to (xii) listed above with respect to the system, mutatis mutandis, in any desired combination or permutation which is technically possible.

According to another aspect of the presently disclosed subject matter there is provided a non-transitory program storage device readable by a computer, tangibly embodying computer readable instructions executable by the computer to perform a method of providing a head orientation relative to an adaptive reference orientation comprising, by a processing unit, receiving head data from a head sensor, the head data describing a first head orientation associated with a user; receiving second data from one or more second sensors; adapting the adaptive reference orientation by moving it at least partly towards said first head orientation by an amount which is varied at least partly in accordance with said second data, thereby generating a new adaptive reference orientation; and generating, in accordance with said first head orientation and said new adaptive reference orientation, a second head orientation associated with the user as said first head orientation relative to said new adaptive reference orientation.

This aspect of the disclosed subject matter can optionally comprise one or more of features (i) to (xii) listed above with respect to the system, mutatis mutandis, in any desired combination or permutation which is technically possible.

According to another aspect of the presently disclosed subject matter there is provided a computer implemented method of providing an adaptive reference orientation usable for determining a relative head orientation of a user, the method comprising:

repeatedly providing:

a) receiving first data sensed by one or more sensors, said first data being indicative of a head orientation associated with a user;

b) obtaining a new adaptive reference orientation by moving a current adaptive reference orientation at least partly towards said indicated head orientation, by an amount which is varied at least partly in accordance with second data, said second data having been sensed by one or more sensors and being indicative of changes of a current frame of reference of the user;

c) computing head orientation relative to said adaptive reference orientation; and d) using said new adaptive reference orientation as a current adaptive reference orientation for a next repeat of operations a)-c).

In addition to the above features, the method according to this aspect of the presently disclosed subject matter can comprise one or more of features (i) to (xiii) listed below, in any desired combination or permutation which is technically possible:

(i) said second data comprises at least part of said first data (ii) said second data comprises said first data and previously received first data (iii) said method further comprises, prior to the obtaining a new adaptive reference orientation:
receiving additional data sensed by one or more sensors, said additional data being indicative of changes of a current frame of reference of the user;
and wherein said second data comprises said received additional sensed data (iv) said amount is varied at least partly in accordance with changes in statistical properties of said second data (v) said new adaptive reference orientation is obtained by rotating said current adaptive reference orientation in accordance with an adjustment amount (vi) said second data is used to compute said adjustment amount.

(vii) said rotating is carried out by interpolating between said current adaptive reference orientation and said indicated head orientation (viii) said adjustment amount is derived from said second data by computing one or more measures, and converting said one or more measures to said adjustment amount, wherein said one or more measures include one or more of relative stability, relative deviation, absolute deviation (ix) said adjustment amount is further processed for at least one of: smoothing, and to control one or more of rise time, hold time, and decay time of said adjustment amount (x) said one or more measures are converted to said adjustment amount by comparing one or more of said one or more measures to one or more respective thresholds (xi) said second data comprises data indicative of at least one of: location, motion, orientation, velocity and acceleration associated with the user in at least one dimension of a three dimensional coordinate system (xii) said method further comprises rendering binaural audio in accordance with the head orientation computed relatively to the new adaptive reference orientation (xiii) said method further comprises rendering one of virtual reality (VR) video and augmented reality (AR) video in accordance with the head orientation computed relatively to the new adaptive reference orientation According to another aspect of the presently disclosed subject matter there is provided a system of providing an adaptive reference orientation usable for determining a relative head orientation of a user, the system comprising:
one or more sensors; and
a processing unit operably coupled to the one or more sensors, the processing unit being configured to repeatedly provide:
a) receiving first data sensed by at least one of the one or more sensors, the first data being indicative of a head orientation associated with a user;
b) obtaining a new adaptive reference orientation by moving the current adaptive reference orientation at least partly towards the indicated head orientation by an amount which is varied at least partly in accordance with second data,
said second data having been sensed by at least one of the one or more sensors, and said second data being indicative of changes of a current frame of reference of the user;
c) computing the head orientation relative to the new adaptive reference orientation; and
d) using the new adaptive reference orientation as a current adaptive reference orientation for a next repeat of operations a)-c).

This aspect of the disclosed subject matter can optionally comprise one or more of features (i) to (xiii) listed above with respect to the method, mutatis mutandis, in any desired combination or permutation which is technically possible.

According to another aspect of the presently disclosed subject matter there is provided a non-transitory program storage device readable by a computer, tangibly embodying computer readable instructions executable by the computer to providing an adaptive reference orientation usable for determining a relative head orientation of a user, the method comprising:
repeatedly providing:
a) receiving first data sensed by one or more sensors, said first data being indicative of a head orientation associated with a user;
b) obtaining a new adaptive reference orientation by moving a current adaptive reference orientation at least partly towards said indicated head orientation, by an amount which is varied at least partly in accordance with second data, said second data having been sensed by one or more sensors and being indicative of changes of a current frame of reference of the user;
c) computing head orientation relative to said adaptive reference orientation; and
d) using said new adaptive reference orientation as a current adaptive reference orientation for a next repeat of operations a)-c).

This aspect of the disclosed subject matter can optionally comprise one or more of features (i) to (xiii) listed above with respect to the method, mutatis mutandis, in any desired combination or permutation which is technically possible.

Among the technical advantages of the presently disclosed subject matter is the ability to perform head tracking in a non-static environment by using data from one or more second sensors operating independently of the head sensor to detect when the user's frame of reference has changed.

Among further advantages is the ability to continually generate an adaptive reference orientation for use in head tracking, thereby enabling the proper placement of virtual objects around the user's head in a non-static environment.

BRIEF DESCRIPTION OF THE DRAWINGS

In order to understand the invention and to see how it can be carried out in practice, embodiments will be described, by way of non-limiting examples, with reference to the accompanying drawings, in which:

FIG. 3 illustrates an example flow diagram of a reference adjustment system in accordance with certain embodiments of the presently disclosed subject matter;

FIG. 8 illustrates relative head orientation relative to the reference orientation in accordance with certain embodiments of the presently disclosed subject matter.

DETAILED DESCRIPTION

Figure 1:
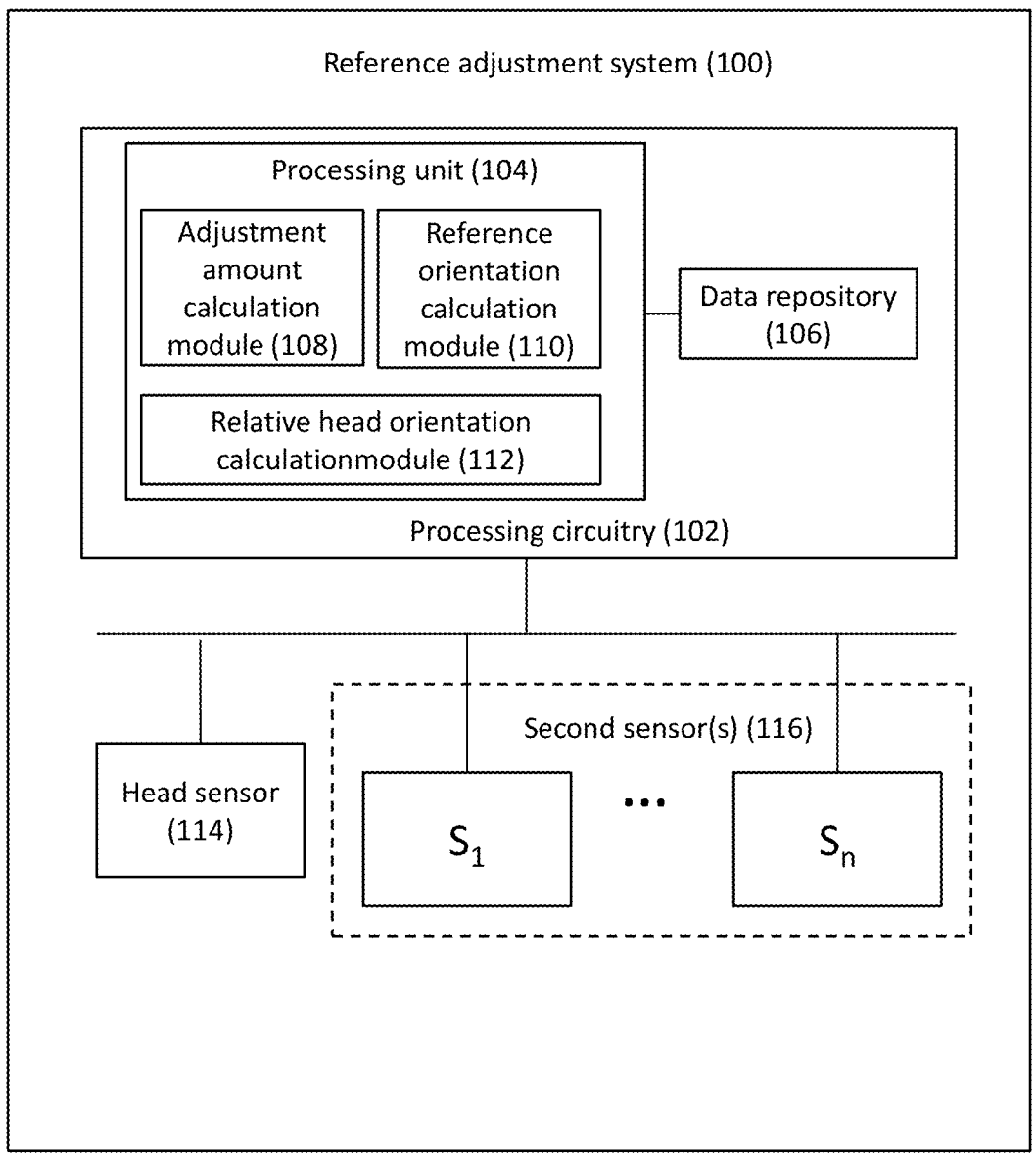
FIG. 1 illustrates an example block diagram of a reference adjustment system in accordance with certain embodiments of the presently disclosed subject matter.

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "computing", "calculating", "adapting", "generating", or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the processing circuitry disclosed in the present application.

The terms "non-transitory memory" and "non-transitory storage medium" used herein should be expansively construed to cover any volatile or non-volatile computer memory suitable to the presently disclosed subject matter.

The operations in accordance with the teachings herein may be performed by a computer specially constructed for the desired purposes or by a general-purpose computer specially configured for the desired purpose by a computer program stored in a non-transitory computer-readable storage medium.

The term "user" used in this patent specification should be expansively construed to cover an individual whose head movements are desirous of being tracked.

The term "head orientation" used in this patent specification should be expansively construed to cover any kind of data (e.g. in the form of a quaternion, rotation matrix or set of Euler angles, etc.) describing the rotation of the user's head in three dimensions (i.e. roll, pitch, yaw), which could also be described in relative terms relative to some other orientation.

The term "frame of reference" used in this patent specification should be understood as a non-mathematical term describing the scene (e.g. audio and/or visual) relative to which the user's head orientation is tracked.

The term "reference orientation" used in this patent specification should be expansively construed to cover any kind of data (e.g. in the form of a quaternion, rotation matrix or set of Euler angles, etc.) describing the rotation of the frame of reference relative to which the head orientation is described.

Embodiments of the presently disclosed subject matter are not described with reference to any particular programming language. It will be appreciated that a variety of programming languages may be used to implement the teachings of the presently disclosed subject matter as described herein.

Bearing this in mind, attention is drawn to FIG. 1, illustrating a simplified block diagram of a reference adjustment system (RAS) (100) for computing an adaptive reference orientation in accordance with certain embodiments of the presently disclosed subject matter. In certain embodiments, RAS (100) can comprise processing circuitry (102) operatively coupled to a head sensor (114) which is configured to provide head data e.g. associated with a user, including e.g. providing the user's head orientation relative to some fixed reference orientation at any given time. In certain embodiments, head sensor (114) can be, e.g. an inertial measurement unit (IMU) coupled to the user's head, either directly or indirectly (e.g. coupled to headphones or other apparatus worn by the user). In certain embodiments, the head data can be stored in a buffer, such as the illustrated data repository (106).

Processing circuitry (102) is further operatively coupled to one or more second sensors $S_1$-$S_n$ (116) which are configured to provide second data indicative of a need to change the reference orientation and which are configured to operate independently of head sensor (114). That is, head sensor (114) and second sensor(s) (116) do not sense one another or otherwise share data with one another. In certain embodiments, second sensor(s) (116) can include, e.g. one or more of an IMU, accelerometer, gyroscope, magnetometer, or other sensor capable of detecting changes to at least one of location, motion (e.g. kinetic motion, physical motion, three-dimensional motion, etc.), orientation, velocity, and/or acceleration associated with the user.

In certain embodiments, processing circuitry (102) can be comprised in a mobile device carried by the user, e.g. a smartphone, tablet, etc. In certain embodiments, the second sensor(s) (116) (or some of them) can also be comprised in a mobile device (which can be the same or different mobile device in which the processing circuitry may be comprised) carried by the user, sitting in the user's pocket, or otherwise physically situated in close proximity to the user, such that second sensor(s) are responsive to changes in the movement of the user.

Processing circuitry (102) can further comprise or be coupled to one or more processing units (104). Processing unit (104) can be, e.g., a processor, a microprocessor, a microcontroller or any other computing device or module, including multiple and/or parallel processing units. Processing circuitry (102) can further comprise (or be otherwise associated with) one or more memories, such as the illustrated data repository (106), configured to store data including, inter alia, received head data and/or second data, as will further be detailed below.

Processing circuitry (102) can further comprise (or be otherwise associated with) one or more of the following modules: Adjustment amount calculation (AAC) module (108), Reference orientation calculation (ROC) module (110), and a Relative head orientation calculation (RHOC) module (112).

In certain embodiments, the AAC module (108) can be configured to continually receive second data from second sensor(s) (116) and to compute a value indicative of an adjustment amount based on said data, as will further be detailed below with reference to FIG. 3, illustrating an example flow diagram of a RAS (100) in accordance with certain embodiments. In certain embodiments, some or all of the second data can be stored in a buffer, such as the data repository (106).

In certain embodiments, the ROC module (110) can be configured to receive a head orientation from head sensor (114), an adjustment amount from the AAC module, and an adaptive reference orientation, and to adapt the adaptive reference orientation by moving it toward the head orientation, thereby generating a new adaptive reference orientation, as will further be detailed below with reference to FIG. 3, illustrating an example flow diagram of a RAS (100) in accordance with certain embodiments.

In certain embodiments, the new adaptive reference orientation is fed back to the ROC module (110) as the next input adaptive reference orientation. For example, the ROC module (110) can include or be associated with a recursive filter (e.g. a smoothing filter, averaging filter, infinite impulse response (IIR) filter, finite impulse response (FIR) filter, etc.) configured to continually receive as input a reference orientation $Q_{ref}[n]$ and a time constant $T_c$ for averaging, and to continually output a new reference orientation $Q_{ref}[n+1]$ by performing a smoothing operation in accordance with $T_c$. The output reference orientation $Q_{ref}[n+1]$ is then fed back into the filter as the next input reference orientation $Q_{ref}[n]$. The time constant $T_c$ may also be continually varied, as will be detailed below.

In certain embodiments, the RHOC module (112) can be configured to receive the most current adaptive reference orientation from the ROC module and the most current head orientation from head sensor (114), and to calculate the user's relative head orientation relative to the current adaptive reference orientation, as will be detailed below with reference to FIG. 3, illustrating an example flow diagram of a RAS (100) in accordance with certain embodiments.

Figure 2:
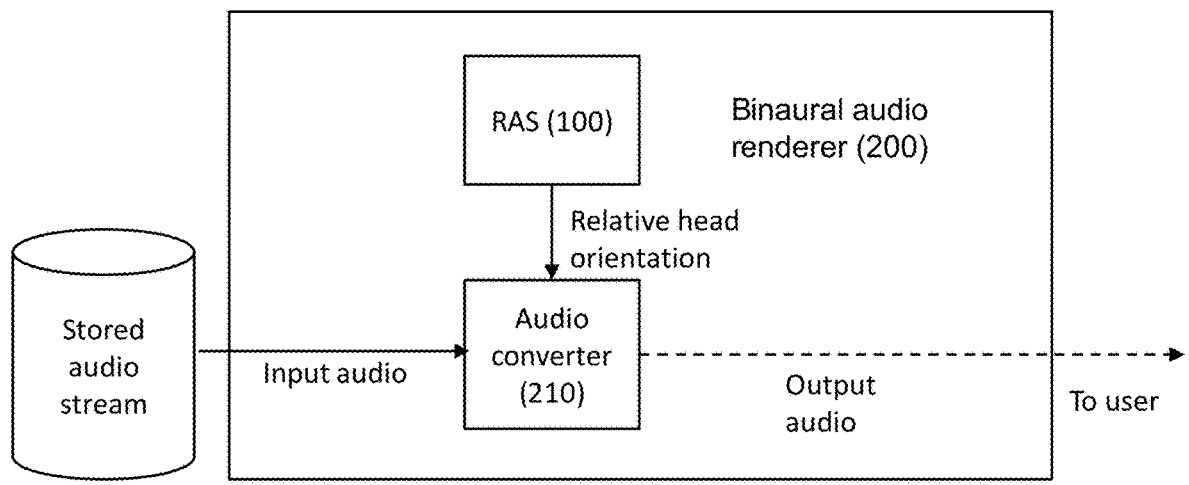
FIG. 2 illustrates an example block diagram of a binaural audio renderer of accordance with certain embodiments of the presently disclosed subject matter.

In certain embodiments, the RAS (100) detailed above can be used for rendering binaural audio, virtual or augmented reality scenes, or any other application that requires placement of virtual objects around the head of the user. By way of non-limiting example, FIG. 2 illustrates a generalized block diagram of a binaural audio renderer (200) comprising the RAS (100) and an audio converter (210) configured to adjust the placement of virtual sound sources in an audio stream and which can be implemented using any combination of software, hardware and/or processing circuitry known in the art. See, for example, U.S. Pat. No. 9,271,103 entitled "Audio control based on orientation", incorporated by reference herein in its entirety. Audio converter (210) receives, in real-time, an audio stream comprising one or more virtual sound sources (such as right and left virtual speakers) and the user's relative head orientation from the RAS (100), and generates an output audio stream having the locations of the one or more virtual sound sources adjusted according to the user's relative head orientation. The output audio stream is then deliver to the user (e.g. via headphones or speakers), also in real-time.

It should be appreciated by those skilled in the art that while FIG. 2 describes, by way of example, rendering binaural audio, the same basic principles apply to rendering AR and/or VR video and should be understood to be included within the scope of the present specification.

FIG. 3 illustrates an example flow diagram of a RAS (100) in accordance with certain embodiments, in which the AAC module (108) receives second data from second sensor(s) (116) and calculates one or more measures (300-1)-(300-N) indicative of a possible need to change the reference orientation (e.g. by providing indicia of a change in the user's current frame of reference). In certain embodiments, the one or more measurements can be changes in the statistical properties of the second data received from second sensor(s). Examples for statistical properties include, e.g. variance, expectation, autocorrelation, cross-correlation, etc. In certain embodiments, the one or measures can include one or a combination of one or more of relative stability, relative deviation, and absolute deviation. Each of these measures will be discussed in more detail below in accordance with embodiments of the presently disclosed subject matter.

In certain embodiments, after having calculated the one or more measures indicative of a need to change the reference orientation (300-1)-(300-N), the AAC module (108) converts the one or more measures to a value indicative of an adjustment amount (302). This conversion can be carried out by comparison of one or more measures to one or more thresholds. For example, the adjustment amount can be a derived value between 0 and 1 which is calculated based on one or a combination of two or more measures, as will be more fully detailed below and illustrated by way of certain examples. The adjustment amount can then be further filtered (304) linearly or non-linearly, e.g. to control one or more of rise time, hold time and decay time, or for smoothing.

The adjustment amount is the amount that the previous reference orientation will move towards the head orientation per time unit. This determines the velocity (e.g. angular velocity) at which the adaptive reference orientation will follow the head. The velocity being some measure of the speed of adaptation of the reference orientation towards the head orientation. This velocity is continuously varied in accordance with data from the second sensor.

Having now calculated an adjustment amount which is based at least in part on the most current second data (and which can be continually recalculated in real-time in response to changes in second data), the current adjustment amount is then fed to the ROC module (110) which uses the adjustment amount and current head orientation for adapting the adaptive reference orientation (306).

The process of adapting the reference orientation is repeated continuously such that the reference orientation is gradually converged toward the current head orientation by an amount which is dictated at least in part by the second data (as illustrated for a single dimension in FIGS. 4A-4B below). This can be achieved, e.g. using interpolation (including, e.g. linear interpolation) techniques known to persons skilled in the art.

For example, if $Q_{ref}$ is a quaternion representation of the reference orientation and $Q_{head}$ is a quaternion representation of the current head orientation, $Q_{ref}$ can be continuously converged towards $Q_{head}$ with the computed AdjustAmount using a spherical linear interpolation operation ("Slerp") in a first order feedback loop, as in Equation 1:

$$Q_{ref}[n] = \text{Slerp}(Q_{ref}[n-1], Q_{head}[n], \text{AdjustAmout}[n]) \quad (1)$$

Figure 5A:
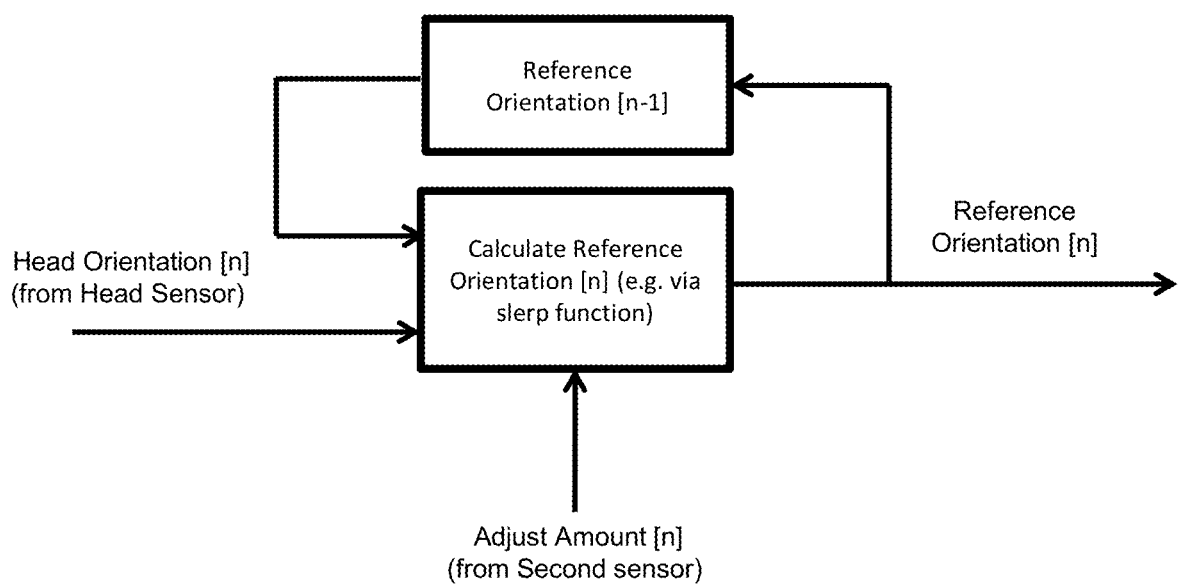
FIG. 5A illustrates a graphical depiction of Equation 1 in accordance with certain embodiments of the presently disclosed subject matter.

Equation 1 can be described as a first order IIR filter. FIG. 5A illustrates a graphical depiction of Equation 1.

In general, a Slerp operation refers to constant-speed motion along a unit-radius great circle arc, given the ends and an interpolation parameter between 0 and 1 (see, e.g. Ken Shoemake: Animating Rotation with Quaternion Curves. SIGGRAPH, Volume 19, Number 3 (1985)). Thus in this example, $Q_{ref}$ and $Q_{head}$ would be the "ends" while the adjustment amount would be the interpolation parameter.

It should be appreciated by a person skilled in the art that there are many methods of calculating a linear interpolation between two orientations, and that Slerp example of Equation 1 is but a single non-limiting example.

As detailed above, each time a new reference orientation is generated by the ROC module (110), the new reference orientation is fed back into the ROC module (110) for generating the next reference orientation. In addition, new reference orientation is also fed to the RHOC module (112) which uses the new reference orientation and the current head orientation to determine the user's relative head orientation (308) relative to the new reference orientation. For example, the relative orientation $Q_{head/ref}$ can be determined from the reference orientation $Q_{ref}$ and the head orientation $Q_{head}$ by multiplication with the inverse quaternion as in Equation 2:

$$Q_{head/ref} = Q_{ref}^{-1} Q_{head} \quad (2)$$

FIG. 8 illustrates an example of generating a relative head orientation relative to the reference orientation in accordance with certain embodiments. It should be appreciated that while the example shown in FIG. 8 is provided for a single dimension, in practice the relative head orientation can be determined in one, two or three dimensions. It should further be appreciated that while the example of FIG. 8 shows an orientation in terms of "degrees", this is non-limiting and in practice any other suitable descriptor of spatial orientation may be used. Referring now to FIG. 8, a first head orientation (802) describes the user's current head orientation as provided by head sensor (114). Reference orientation (804) describes the current reference orientation which was most recently generated by the ROC module (110). Thus, in this example the RHOC module (112) may generate a second head orientation (806) which is the user's relative head orientation relative to the current reference orientation.

The above process is repeated continuously such that the user's relative head orientation is continuously being determined, and possibly in real-time response to the user's head movements, according to which $Q_{head/ref}$ can be used as the head orientation in any moving VR, AR or binaural environment.

As detailed above, in certain embodiments, prior to being fed to the ROC module (110), the adjustment amount may undergo a filtering process, e.g. to control the adjustment amount according to a predetermined minimum and/or maximum and/or filtered linearly and/or non-linearly to control one or more of the rise time, hold time, and decay time in order to create an optimal and natural motion of the reference orientation. For example, a maximum time constant of 60 sec corresponding to some minimum amount will ensure that the reference orientation will always be slowly moving towards the head direction to compensate for small or slowly accumulating drifts. In another example, a short rise time (0 sec) and longer hold and decay times (2 secs) could be set on the amount such that if a sudden, short transient occurred, the amount would respond immediately causing the reference orientation to tightly follow the head (to compensate for the drastic change) all through the hold time. Then, slowly as the decay time fades out, the reference orientation eventually stay static and normal tracking would be resumed.

Figure 4A:
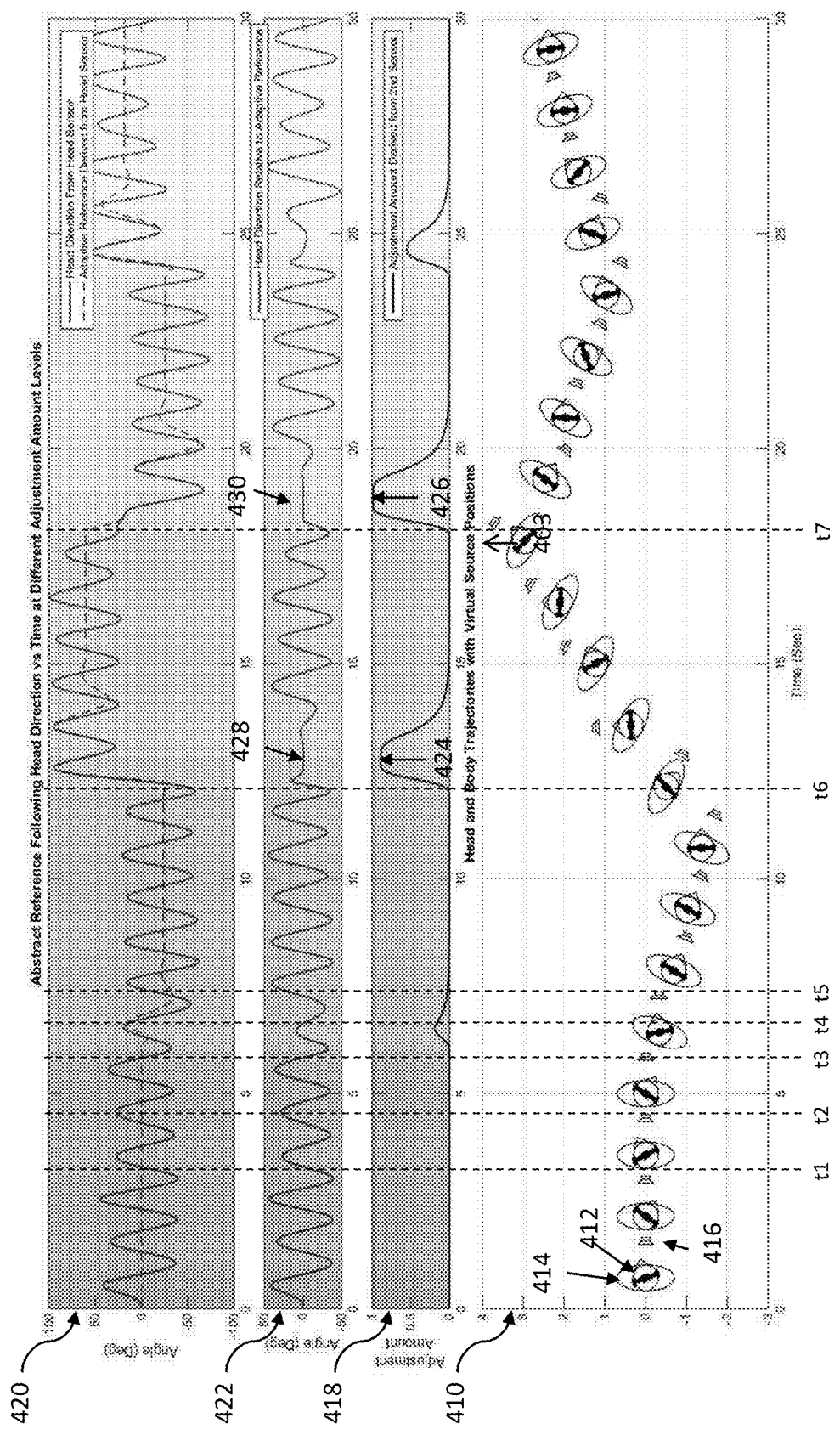
FIG. 4A illustrates an example graph of a converging adaptive reference orientation in accordance with certain embodiments of the presently disclosed subject matter.
Figure 4B:
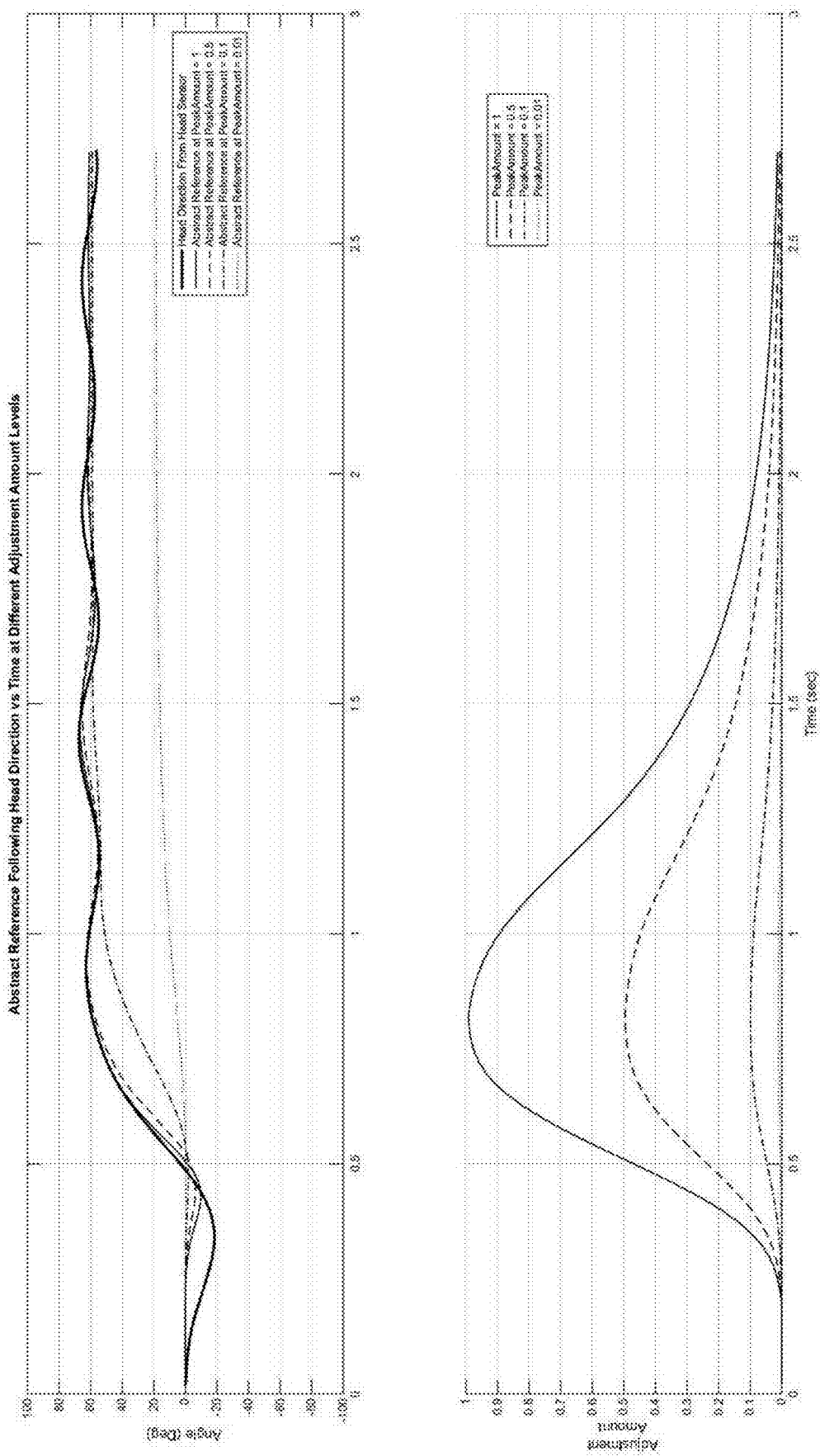
FIG. 4B illustrates an example zoomed-in graph of a converging adaptive reference orientation in accordance with certain embodiments of the presently disclosed subject matter.

FIG. 4A illustrates a continuous time graph showing, in a single dimension, an adaptive reference orientation that is moved toward the head orientation by an amount that is varied according to the second data. For example, the amount can be varied at least partly in accordance with changes in the statistical properties of the second data. It should be appreciated that a single dimension is shown in order to illustrate the concept; in reality the head orientation can be tracked and the reference orientation can be moved in more than one dimension, i.e. up to three dimensions (pitch, yaw, roll). Further, the term "direction" is used to describe orientation in one dimension. The graph shown in FIG. 4A simulates the condition where the second sensor(s) are attached to the user's torso (e.g. in the user's mobile device in the user's pocket) and detect changes of motion and/or orientation of the torso. The graph shows sample adaptive reference orientations that may be output by the ROC module (110) during a continuous time period of receiving head data and second data.

FIG. 4A is divided into four distinct line graphs (410), (418), (420), (422) in order to better illustrate the concept of the disclosed subject matter. Line graph (410) visually illustrates a top down view of the user's head (412) and torso (414) at different sampling times during a continuous time period in which the direction of the torso (414) changes (e.g. the user may be walking, running, etc.), and in which the direction of the user's head (412) also changes independently of the torso. Also illustrated is a virtual speaker (416) which may be positioned differently depending on the direction of the particular adaptive reference orientation which is generated at a particular time during the continuous time period. In general, when the user's torso direction is stable, the virtual speaker is placed directly in front of the torso regardless of head direction, whereas if the torso direction is changing, the virtual speaker is moved toward the head, i.e. to a position which more closely corresponds to the head direction, as is made apparent from (410).

Line graph (418) of FIG. 4A illustrates sample values representing the adjustment amount value that may be calculated at any given time based on the second data received from the second sensor attached to the torso (414). For example, between time t1 and t2, the adjustment amount is shown to be zero because the torso direction is stable, as is also illustrated visually for the same time period in graph (410). By contrast, between t3 and t4, the adjustment amount rises to ~0.2 in response to second data indicative of the changing torso direction at that time. From t5 to t6, the adjustment amount remains substantially zero, reflecting second data which is indicative of stability of the torso direction between t5 and t6. The adjustment amount rises begins to rise again at t6 to a peak value (424) of ~0.8, and at t7 to a peak value (426) of ~1, in response to second data indicative of a substantial change in stability of torso direction.

Line graph (420) of FIG. 4A illustrates, via a solid line, sample values representing the head direction during the continuous time period and, via a dotted line, sample values representing the adaptive reference orientation that may be calculated during the continuous time period. Thus between t1 and t3, when the torso direction is stable, the reference orientation appears to be constant (though it is in fact converging very slowly to the head direction) at a zero angle offset which is reflective of the virtual speaker (416) being positioned directly in front of the torso between t1 and t3, despite the alternating head movements. By contrast, at times t6 and t7 the direction of the reference orientation in (420) can be seen rapidly converging with the head direction in response to the respective increases to the adjustment amounts to ~0.8 and ~1.

Line graph (422) of FIG. 4A illustrates the relative head direction of the user relative to the adaptive reference orientation, which is computed by the RHOC module (112). Thus for example, at t3 when the direction of the adaptive reference orientation is substantially equal to the head direction, the user's relative head direction (i.e. offset) is substantially zero. Also, as the adjustment amount in (418) moves to ~0.8 and ~1 at t6 and t7, respectively, the relative head direction in (422) can be seen moving to zero at (428) and (430), respectively. The sample values for relative head direction in (422) can be used, e.g. to effect the rendering of binaural audio, VR, AR, etc. as detailed above.

As illustrated in FIG. 4A, as long as there is only head movement, the reference orientation is constant and the virtual speaker appears fixed (i.e. static) in space. Only a change in the direction of the torso causes the reference orientation to change. When this happens, the reference orientation is converged toward the head orientation, (simulating the movement of the virtual speaker to follow the head) until the torso direction stabilizes. Thus for example in line graph (410) it can be seen, e.g. that from time t1 to time t2, the user's torso direction is relatively unchanged and therefore the second data yields an adjustment amount of zero, translating to a near constant reference orientation, despite the user's left-right head movements as seen in line graphs (410) and (420). Note, however the changing relative head direction in line graph (422) for the same time period. The sample values for relative head direction in (422) can be used, e.g. to effect the rendering of binaural audio as detailed above.

It should be noted that due to the zoom level of the graph shown in FIG. 4A, while it may appear that at (424) and (426) the reference orientation in (420) is equal to the head orientation, in fact at (424) the reference orientation does not exactly equal the head orientation since the adjustment amount is less than 1. FIG. 4B therefore illustrates a zoomed in graph similar to the top and middle portions of the graph of FIG. 4A in which it can be seen that as the adjustment amount approaches 1 but does not equal 1, the reference orientation moves closer to the head orientation but does not equal the head orientation. Only in the case where the adjustment amount is equal to 1 is the reference orientation equal to the head orientation.

In certain embodiments, as detailed above, the one or measures can include one or a combination of one or more of relative stability, relative deviation, and absolute deviation. Each of these measures will be now be discussed in more detail and examples will be provided.

Example #1: Relative Stability

This measure compares the current short time sample variance to an earlier long term sample variance and returns an indicator of relative increase in variance. Let the variance S of each sensor (per axis) over the samples between n-N and n be denoted using Equation 3:

$$S\{n, n-N\} = \frac{1}{N} \sum_{i=1}^{K} (x_i - m)^2 \qquad (3)$$

The relative stability per axis (not normalized) is given by Equation 4:

$$RS\_UNNORM_{perSensorPerAxis}[n] = \max((S\{n,n-N_1\} - S\{n-N_1,n-N_1-N_2\}), 0) \qquad (4)$$

where $N_1$ and $N_2$ are sample groups (time windows) over which the variances are computed, and n is the current sample. Normalizing this for total variance of variances using the variance of a variance for normal distribution is given by:

$$Var(S) = \frac{2S^2}{(N-1)}$$

which translates to a pooled variance of the two sets given by:

$$TotalVarVar = 2\sqrt{\frac{S^2\{n, n-N_1\}}{N_1-1} + \frac{S^2\{n-N_1, n-N_1-N_2\}}{N_2-1}}$$

Thus the normalized relative stability per axis per sensor can be written as Equation 5:

$$RS_{perSensorPerAxis} = \frac{\max((S\{n, n-N_1\} - S\{n-N_1, n-N_1-N_2\}), 0)}{2\sqrt{\frac{S^2\{n, n-N_1\}/(N_1-1) + }{S^2\{n-N_1, n-N_1-N_2\}/(N_2-1)}}} \qquad (5)$$

Figure 5B:
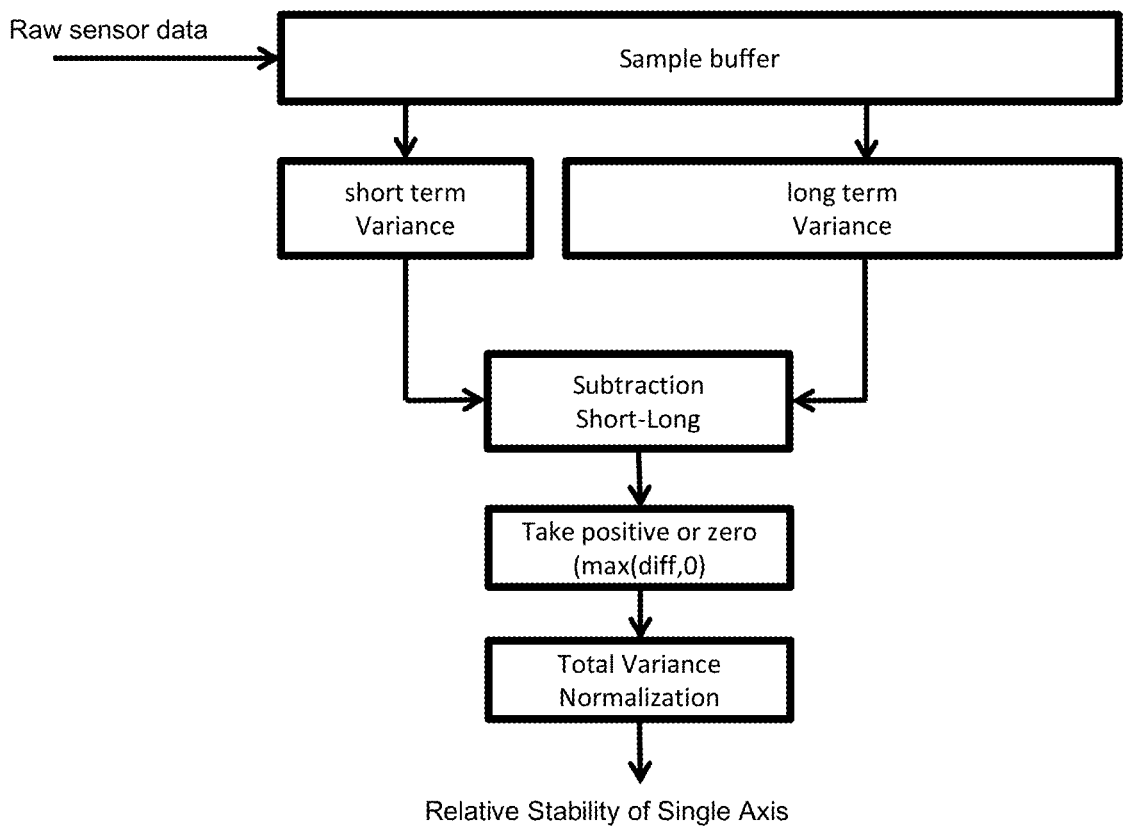
FIG. 5B illustrates a graphical depiction of Equations 3-5 in accordance with certain embodiments of the presently disclosed subject matter.

The denominator normalizes the variances by the total variance of variance, and thus the variance is used as a random variable to achieve a unit-less measure of change in variance. A unit-less measure is critical in order to set one threshold for different device and sensors types. FIG. 5B illustrates a graphical depiction of Equations 3-5.

Figure 5C:
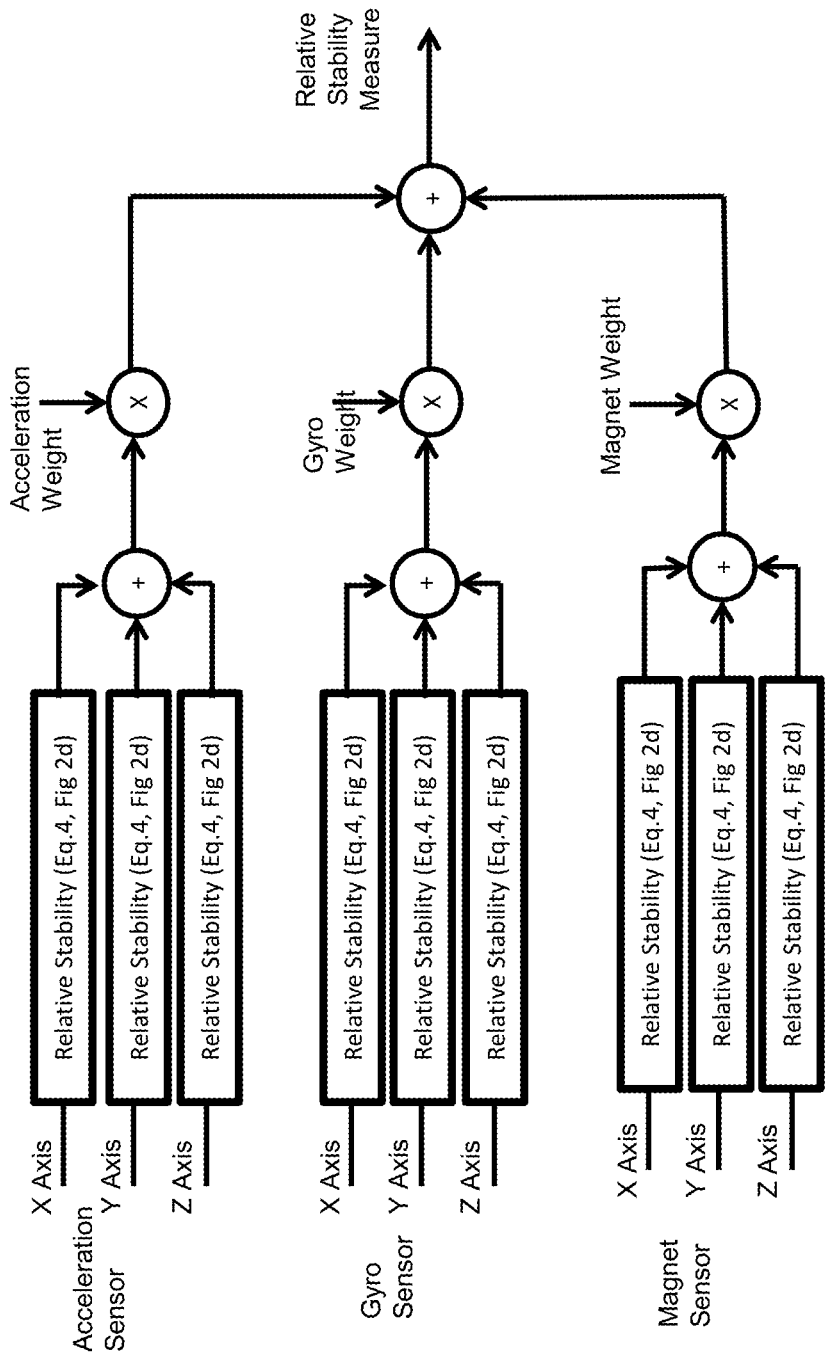
FIG. 5C illustrates a graphical depiction of Equation 6 in accordance with certain embodiments of the presently disclosed subject matter.

Finally, the relative stability calculated for each axis per sensor can be combined by root mean square (RMS) and also combined between sensors by a weighted RMS to allow different weighting per sensor, e.g. using Equation 6:

$$\text{Total } RS = \sqrt{\frac{1}{K} \sum_{i=1}^{K} (RS_{i,x}^2 + RS_{i,y}^2 + RS_{i,z}^2) \times weight_i} \qquad (6)$$

where K is the number of sensors. For example, for three axis gyro and three axis accelerometer, K=2. Then, for example at 100 Hz, if $T_1$=0.5 sec and $T_2$=2.0 sec, then $N_1$=50, $N_2$=200. In this example, the stability of the current half second (short term) is compared to that of the preceding two seconds (long term). FIG. 5C illustrates a graphical depiction of Equation 6.

Example #2: Relative Deviation

This measure compares the mean reference orientation between two adjacent time spans. Computing the geometrical mean quaternion of a set of four-dimensional quaternions can be achieved using the 'Slerp' operation described above. This operation ensures that the interpolation between two quaternions is done via the shortest path (i.e. the greater circle). In order to compute the mean over period of $T_c$, the Slerp operation can be used in a recursive fashion as in Equation 7:

$$Q_{mean}[n] = \text{Slerp}((Q_{mean}[n-1], Q_{in}[n], \alpha) \qquad (7)$$

where α is the relative amount to Slerp over each step, and is defined by the time constant $T_c$ and the tracking sample rate $F_s$ as per Equation 8:

$$\alpha = 1 - e^{-1/(F_s * T_c)} \qquad (8)$$

To compute a variance for quaternions, a distance measure is defined, e.g. the angle between the two quaternions computed by the dot product as in Equation 9:

$$OrientationDiff(Q_1, Q_2) = \theta_{diff}(Q_1, Q_2) = a\cos\left(\frac{Q_1 \cdot Q_2}{|Q_1||Q_2|}\right) \qquad (9)$$

The variance can then be computed as in Equation 10:

$$S_Q = \frac{\sum_{i=1}^{N} \theta_{diff}^2(Q_i, Q_{mean})}{N-1} \qquad (10)$$

It should be noted that $Q_{mean}$ is a vector, but the variance $S_Q$ is a scalar in units of squared angles.

The means and variances are computed twice, once over the last second (or any other time span), and again over the preceding second (or any other time span), i.e.:

$$Q_{mean1} = Q_{mean}(t, t-T) \text{ and } Q_{mean2} = Q_{mean}(t-T, t-2T);$$
and $$S_{Q1} = S_Q(t, t-T) \text{ and } S_{Q2} = S_Q(t-T, t-2T)$$

T is a time constant over which the mean and variance of orientations are computed. For example, when T=1 sec, the orientation in the current second is compared to that of the previous second.

Using the means and variances, the relative deviation can be computed which is also unit-less, using Equation 11:

$$RelativeDeviation = \frac{|\theta_{diff}(Q_{mean1}, Q_{mean2})|}{\sqrt{\frac{1}{2}(S_{Q1} + S_{Q2})}} \quad (11)$$

Figure 5D:
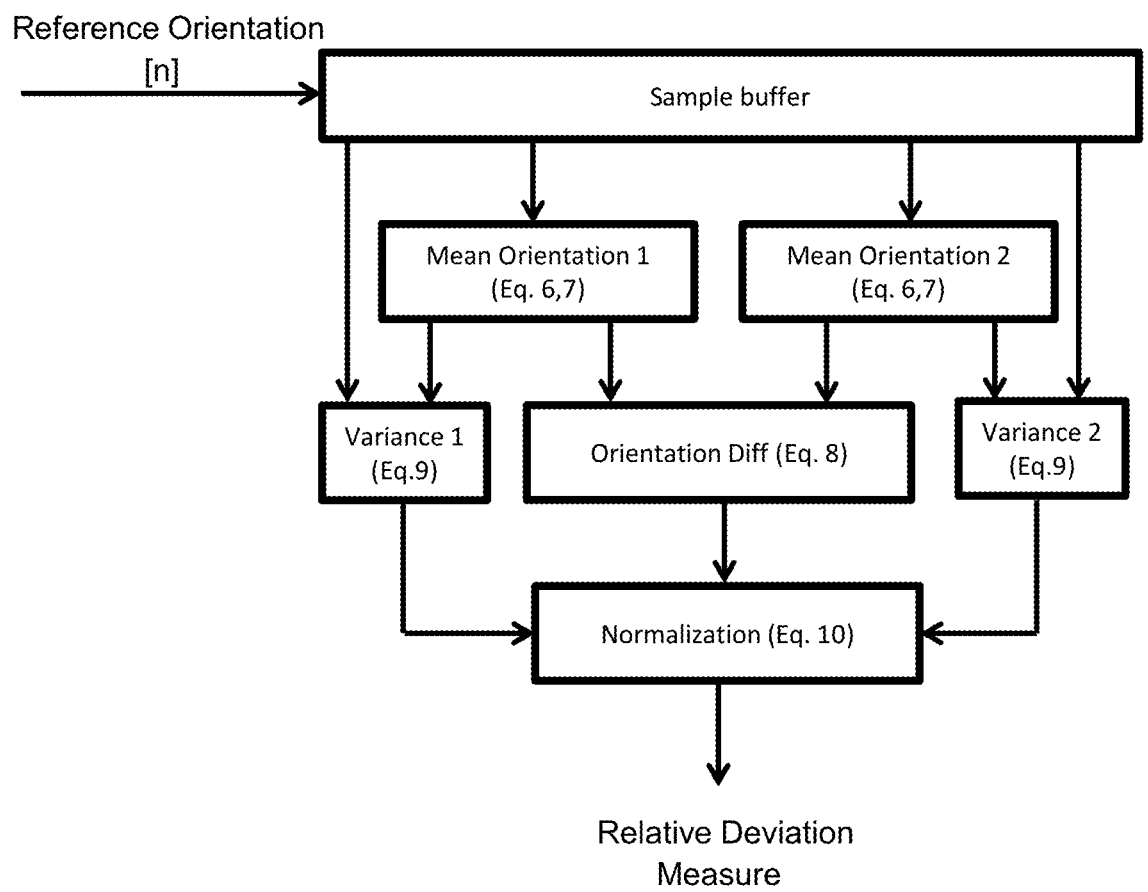
FIG. 5D illustrates a graphical depiction of Equations 7-11 in accordance with certain embodiments of the presently disclosed subject matter.

FIG. 5D illustrates a graphical depiction of Equations 7-11.

Example #3: Combination of Relative Stability and Relative Deviation

This measure is computed by combining the measures of relative stability and relative deviation which were detailed above. These measures can be combined, e.g. using root mean squares as in Equation 12:

$$RelativeMeasureTot = \sqrt{\frac{\sum_{i=0}^{N} Measure_i^2}{N}} = \sqrt{\frac{StabilityMeasure^2 + RelativeDeviation^2}{2}} \quad (12)$$

Figure 5E:
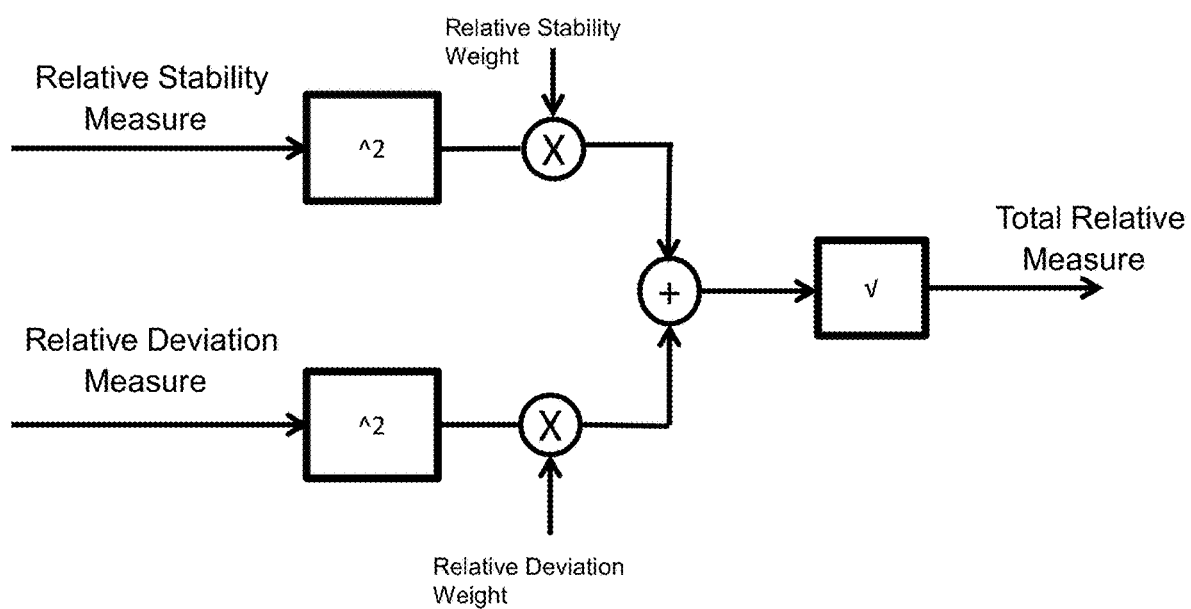
FIG. 5E illustrates a graphical depiction of Equation 12 in accordance with certain embodiments of the presently disclosed subject matter.

In certain embodiments, the individual measures (i.e. relative stability and relative deviation) can each be assigned a respective weight. FIG. 5E illustrates a graphical depiction of Equation 12.

Example #4: Absolute Deviation

This measure aims to cope with situations where slow motion occurs which might not be caught by the two examples above. This measure (provided in angular units) compares the mean second-sensor's orientation with some reference anchor, the anchor being some past orientation. When the deviation from the anchor exceeds a threshold the anchor is set to the current second-sensor's orientation, as in Equation 13:

$$AbsDeviationMeasure = |\theta_{diff}(Q_{mean}, Q_{anchor})| \quad (13)$$

Conversion of Measures to Adjustment Amount

Figure 5F:
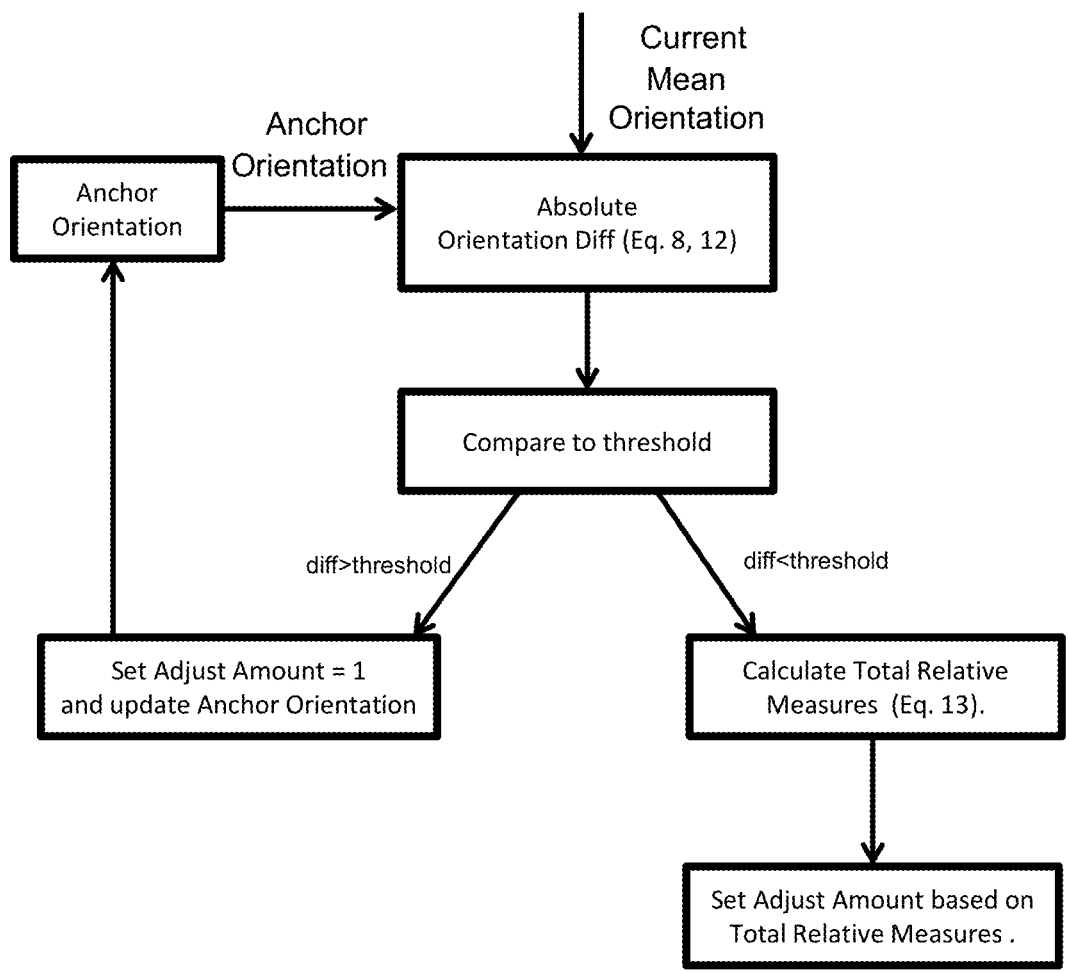
FIG. 5F illustrates a graphical depiction of Equation 14 in accordance with certain embodiments of the presently disclosed subject matter.

As detailed above, the adjustment amount can be derived from one or a combination of two or more measures. For example, referring to the example measures of relative stability, relative deviation and absolute deviation which were detailed above, the adjustment amount can be calculated as per Equation 14:

$$AdjustAmount = \begin{cases} 1 & \text{if } \left( \begin{array}{c} AbsDevMeasure > \\ AbsThreshold \end{array} \right) \\ \frac{RelMeasureTot^p}{RelMeasureTot^p + RelThreshold^p} & \text{otherwise} \end{cases} \quad (14)$$

where p is some power value. FIG. 5F illustrates a graphical depiction of Equation 14. The value of relative threshold determines the point where the amount is equal to ½. The value of p determines rapidness of how the amount will shift from 0 to 1 as a function of the relative measure and the relative threshold, as illustrated in FIG. 6.

Figure 6:
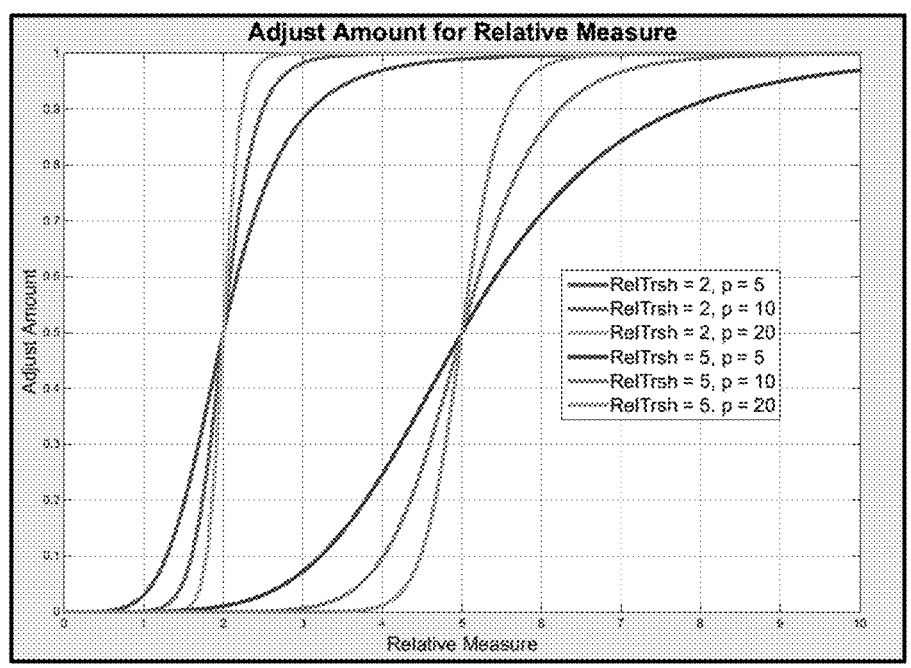
FIG. 6 illustrates an example graph of sample adjustment amounts calculated for different values of relative measures in accordance with certain embodiments of the presently disclosed subject matter.

If the absolute deviation measure exceeds the absolute threshold (e.g. in degrees or other unit of orientation), the AdjustAmount is set to 1, otherwise, it is set smoothly in the range 0-1 with the position and shape of the slope controlled by the RelThreshold and p respectively as illustrated in FIG. 6, illustrating an example graph of sample adjustment amounts calculated for different values of relative measures and different power values.

As detailed above, the example linear interpolation operation provided in Equation 1 can be described as a first order IIR filter. In systems such as this it is typical to define a filter time constant Tc over which the value of the output reaches a value of $$1 \pm \frac{1}{e}$$

of the target value. Under these definitions, the relation between the adjustment amount and the Tc is described in Equations 15 and 16:

$$AdjustAmount = 1 - e^{-1/(F_s * T_c)} \quad (15)$$

$$T_c = -\frac{1}{F_s \log(1 - AdjustAmount)} \quad (16)$$

where log is the natural logarithm and $F_s$ is the sample rate.

However, the adjustment amount varies based on second sensor data so Tc is not constant as described in Equation 17:

$$T_c[n] = -\frac{1}{F_s \log(1 - AdjustAmount[n])} \quad (17)$$

Using Tc[n], the reference orientation can be described as adapting at a velocity proportional to 1/Tc[n].

Figure 7:
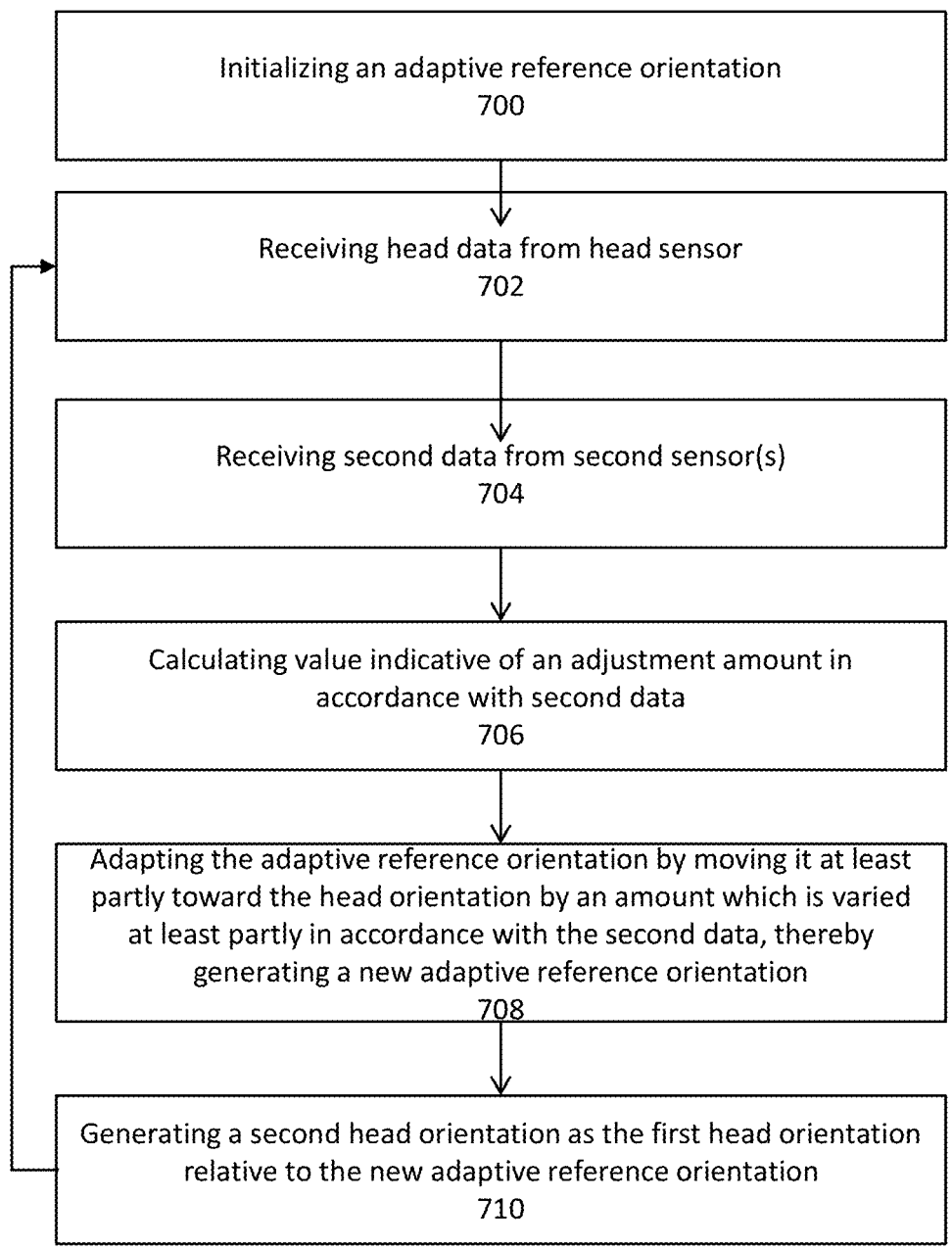
FIG. 7 illustrates an example of flow chart of a sequence of operations carried out for generating a relative head orientation in accordance with certain embodiments of the presently disclosed subject matter.

FIG. 7 illustrates an example flow chart of a sequence of operations that may be carried out by the processing unit for providing a head orientation relative to an adaptive reference orientation in accordance with certain embodiments. At block 700, the processing unit initializes an adaptive reference orientation to be used as the starting reference orientation. In certain embodiments, initializing a reference orientation can include, e.g. generating a default, or arbitrary, reference orientation and setting the adjustment amount equal to 1 thereby guaranteeing the generated reference orientation will quickly converge to the head orientation.

At block 702, processing unit receives head data from head sensor (114). The head data describes a first head orientation associated with a user. In certain embodiments, head data is continually being received from the head sensor, for example at a predetermined sampling rate, such that the most recently received head data thereby describes the current first head orientation.

Substantially concurrently with receiving head data, at block 704 the processing unit receives second data from the one or more second sensors (116). In certain embodiments, second data is continually received from the one or more second sensors, for example at respective predetermined sampling rates, such that the most recently received second data thereby describes the most current second data. In certain embodiments, as detailed above, the second data comprises data indicative of a need to change the adaptive reference orientation, e.g. data indicative of location, motion, orientation, velocity and/or acceleration associated with the user in at least one dimension of a three dimensional coordinate system.

At block 706, the processing unit, e.g. AAC module (108), continually calculates a value indicative of an adjustment amount at least partly in accordance with the most current second data. In certain embodiments, the adjustment amount can be derived or computed from the second data, for example by computing one or more measures from the second data (e.g. based on changes in statistical properties of the second data) and converting the one or more measures to an adjustment amount. In certain embodiments, the one or more measures can be converted to an adjustment amount by comparing one or more of the measures to one or more respective thresholds. The one or more measures can include, e.g. relative stability, relative deviation and/or absolute deviation. In certain embodiments, the adjustment amount may be further filtered for smoothing and/or to control one or more of rise time, hold time, and decay time.

At block 708, the processing unit, e.g. ROC module (110), continually adapts the adaptive reference orientation by moving it at least partly toward the head orientation (as provided by the head data) by an amount which is varied at least partly in accordance with the second data, thereby generating a new adaptive reference orientation. In certain embodiments, the amount can be determined by the adjustment amount. In certain other embodiments, the amount can be derived from a filter time constant Tc over which the value of the reference orientation will converge at least partly towards the current head orientation. In certain embodiments, adapting the adaptive reference orientation can include rotating the adaptive reference orientation in accordance with the adjustment amount calculated at block 706. The rotating can be achieved, e.g. by means of a quaternion "Slerp" between the adaptive reference orientation and the first head orientation.

At block 710, the processing unit, e.g. RHOC module (112), generates data indicative of a second head orientation associated with the user in accordance with the user's first head orientation (received at block 702) and the new adaptive reference orientation (generated at block 708), in which the second head orientation describes the user's first head orientation relative to the new adaptive reference orientation. In certain embodiments, the user's second head orientation can be used for rendering at least one of binaural audio, VR video and/or AR video, which can then be delivered to the user via headphones, oculus, or other listening and/or viewing apparatus. Execution then returns to block 702 and the sequence of operations 702-710 is repeated wherein the new adaptive reference orientation generated at block 710 constitutes the next reference orientation to be adapted at block 708.

At each execution of block 710, the user's most current relative head orientation is generated relative to the adaptive reference orientation, thereby enabling the delivery of the rendered audio and/or video to the user in response to the user's head movements in real-time or near real-time with the user's head movements.

It is noted that the teachings of the presently disclosed subject matter are not bound by the system described with reference to FIG. 1. Equivalent and/or modified functionality can be consolidated or divided in another manner and can be implemented in any appropriate combination of software with firmware and/or hardware and executed on a suitable device.

It is noted that the teachings of the presently disclosed subject matter are not bound by the flow chart illustrated in FIG. 7, the illustrated operations can occur out of the illustrated order. For example, operations 702 and 704 shown in succession can be executed substantially concurrently or in the reverse order. It is also noted that whilst the flow chart is described with reference to elements of system (100), this is by no means binding, and the operations can be performed by elements other than those described herein.

Figure 1A:
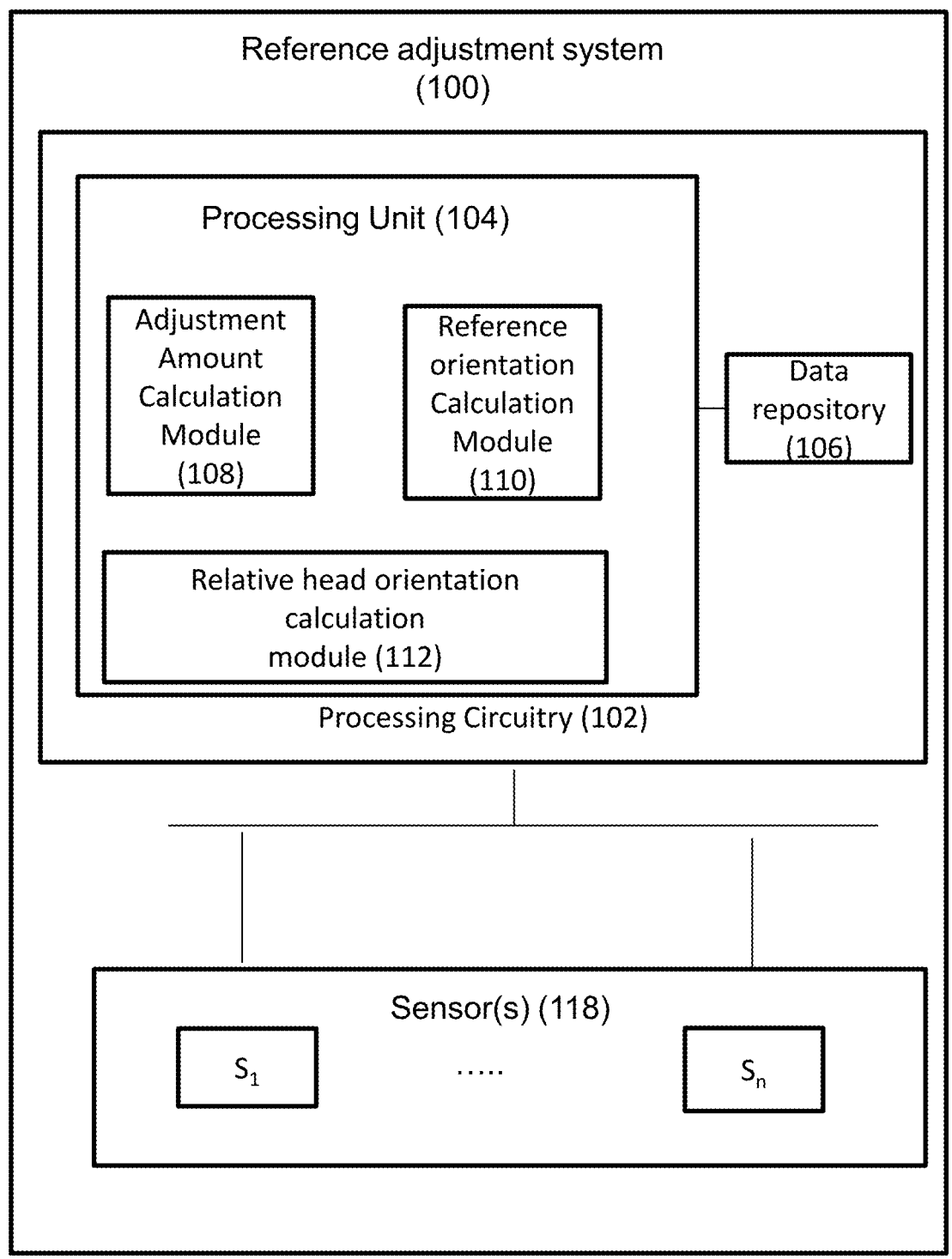
FIG. 1A illustrates an example block diagram of a variation of a reference adjustment system in accordance with certain embodiments of the presently disclosed subject matter.

Attention is now directed to FIG. 1A, which illustrates an example a block diagram of a variation of the reference adjustment system, in accordance with some embodiments of the presently disclosed subject matter.

In reference adjustment system 100 as illustrated in FIG. 1, a dedicated sensor senses the user's head orientation, and one or more second sensors sense data indicative of changes in the current frame of reference of the user. In the variation of reference adjustment system 100 illustrated in FIG. 1A, there can instead be a single group of one or more general purpose sensors 118.

By way of non-limiting example, sensors 118 can include an accelerometer, gyroscope, magnetometer etc. sensors 118 can also include compound sensors—such as (for example) an inertial measurement unit (IMU), which itself includes other sensors such as a gyroscope etc.

In some embodiments, one sensor or group of sensors of sensors 118 can sense user head orientation (or data indicative of user head orientation), while a distinct sensor or group of sensors can sense changes in the user's current frame of reference (or data indicative of changes in the user's current frame of reference). By way of non-limiting example: in some embodiments an IMU in a user headset can sense a current head orientation of the user, and a separate body-mounted IMU can sense the user's body orientation which can be indicative of changes of the current frame of reference of the user.

In some other embodiments, one sensor or group of sensors of sensors 118 can sense user head orientation (or data indicative of user head orientation), and this data can itself be indicative of a change of frame of reference. By way of non-limiting example: in some embodiments, an IMU in a user headset can sense a current head orientation of the user, and—in combination with previous measurements of head orientation—this current orientation can provide data indicative of change of the current frame of reference. By way of a more specific non-limiting example: if a number of successive headset IMU measurements indicates that the user has a large absolute deviation of head orientation from the adaptive reference orientation (e.g. exceeding a threshold of deviation) for an extended period of time (e.g. in excess of a time threshold), this can be indicative of a change of the current frame of reference (e.g. it can indicate that the user's body orientation has changed).

Moreover, in some embodiments, a component of the data indicative of user orientation can itself be indicative of a change of frame of reference. By way of non-limiting example, sensors 118 can include a headmounted accelerometer, gyroscope, and magnetometer, and data from these three sensors can be used to indicate user head orientation. The sensed accelerometer data can be independently indicative of a change of reference e.g. a sudden acceleration can indicate a drastic movement of the user which constitutes a change of current frame of reference.

Figure 7A:
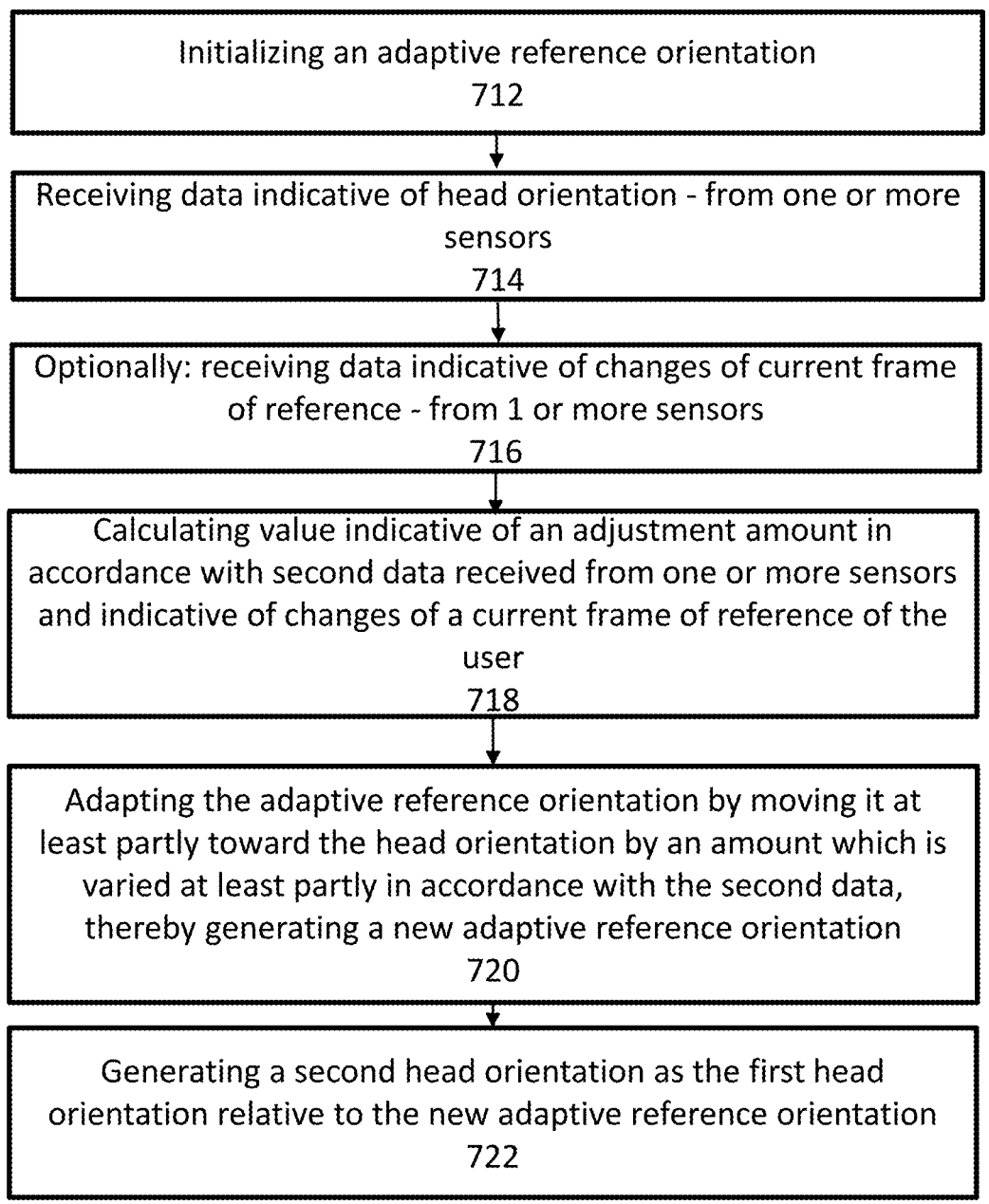
FIG. 7A illustrates an example of flow chart of a variation of a sequence of operations carried out for generating a relative head orientation in accordance with certain embodiments of the presently disclosed subject matter.

Attention is now directed to FIG. 7A, which illustrates an example flow chart of a variation of a sequence of operations that can be carried out by the processing unit for providing a head orientation relative to an adaptive reference orientation in accordance with certain embodiments. The method illustrated in FIG. 7A can utilize—for example—a reference adjustment system 100 such as the one illustrated in FIG. 1A.

The processing unit 104 can initialize (712) an adaptive reference orientation to be used as the starting reference orientation as described above with reference to FIG. 7.

Processing unit 104 can next receive (714)—from one or more sensors of the group of sensors 118—sensed first data indicative of a head orientation associated with a user (e.g. relative to a certain fixed initial orientation). In certain embodiments, this head data is continually being received from the sensor(s), for example at a predetermined sampling rate, such that the most recently received data thereby indicates the current head orientation.

Optionally: in some embodiments, before calculating an adjustment amount, processing unit 104 can receive (716) additional sensed data indicative of changes of a current frame of reference of the user—from one or more sensors of the group of sensors (118), and second data comprises the additional sensed data. In some of these embodiments, processing unit 104 receives the additional data from sensors in the group of sensors (118) that are not identical with (for example: distinct from) the sensors used for determining user head orientation.

Processing unit 104 e.g. AAC module (108) can continually calculate (718) a value indicative of an adjustment amount. In calculating this adjustment amount, processing unit 104 e.g. AAC module (108) can utilize sensed second data that was received from one or more sensors of the group of sensors (118) and is indicative of changes of a current frame of reference of the user.

In some embodiments, the second data includes at least part of the first data. By way of non-limiting example: in some embodiments, the first data can include accelerometer data together with data from other sensors. The accelerometer data can be indicative of changes of the current frame of reference as described above with reference to FIG. 1A.

In some embodiments, the second data can include the first data in combination with previously received sensed data indicative of the head orientation associated with the user (i.e. the head data sensed in previous iterations of determining the adaptive reference orientation)—as described above with reference to FIG. 1A.

In some embodiments, the second data can include the optional additional sensed data indicative of changes of a current frame of reference of the user as described herein above.

In some embodiments, the second data can include the optional additional sensed data and at least part of the first data.

Processing unit 104 e.g. AAC module (108) can calculate (718) the adjustment amount at least partly in accordance with the current second data. In certain embodiments, the adjustment amount can be derived or computed from the second data, for example by computing one or more measures from the second data (e.g. based on changes in statistical properties of the second data) and converting the one or more measures to an adjustment amount. In certain embodiments, the one or more measures can be converted to an adjustment amount by comparing one or more of the measures to one or more respective thresholds. The one or more measures can include. e.g. relative stability, relative deviation and/or absolute deviation. In certain embodiments, the adjustment amount may be further filtered for smoothing and/or to control one or more of rise time, hold time, and decay time.

Processing unit 104 e.g. ROC module (110), can continually adapt (720) the adaptive reference orientation by moving it at least partly toward the head orientation (as indicated by the first data) by an amount which is varied at least partly in accordance with the second data, thereby generating a new adaptive reference orientation. In certain embodiments, the amount can be determined by the adjustment amount. In certain other embodiments, the amount can be derived from a filter time constant Tc over which the value of the reference orientation will converge at least partly towards the current head orientation. In certain embodiments, adapting the adaptive reference orientation can include rotating the adaptive reference orientation in accordance with the calculated adjustment amount. The rotating can be achieved, e.g. by means of a quaternion "Slerp" between the adaptive reference orientation and the indicated head orientation.

Processing unit, e.g. RHOC module (112), can generate (722) data indicative of a second head orientation associated with the user in accordance with the user's first head orientation (as indicated by the received first data) and the new adaptive reference orientation (generated from the previous adaptive reference orientation in accordance with second data). In some embodiments, the second head orientation describes the user's first head orientation relative to the new adaptive reference orientation. In certain embodiments, the user's second head orientation can be used for rendering at least one of binaural audio, VR video and/or AR video, which can then be delivered to the user via headphones, head mounted display (HMD), or other listening and/or viewing apparatus. Execution can then return to block 712 and the sequence of operations 712-722 can be repeated wherein the new adaptive reference orientation generated at block 720 constitutes the next reference orientation to be adapted at block 712.

At each execution of block 722, the user's most current relative head orientation is generated relative to the adaptive reference orientation, thereby enabling the delivery of the rendered audio and/or video to the user in response to the user's head movements in real-time or near real-time with the user's head movements.

In certain embodiments, as detailed above, the second data comprises data indicative of a need to change the adaptive reference orientation, e.g. data indicative of location, motion, orientation, velocity and/or acceleration associated with the user in at least one dimension of a three dimensional coordinate system.

It is noted that the teachings of the presently disclosed subject matter are not bound by the system described with reference to FIG. 1A. Equivalent and/or modified functionality can be consolidated or divided in another manner and can be implemented in any appropriate combination of software with firmware and/or hardware and executed on a suitable device.

It is noted that the teachings of the presently disclosed subject matter are not bound by the flow chart illustrated in FIG. 7A, the illustrated operations can occur out of the illustrated order. For example, operations 714 and 716 shown in succession can be executed substantially concurrently or in the reverse order. It is also noted that whilst the flow chart is described with reference to elements of system (100), this is by no means binding, and the operations can be performed by elements other than those described herein.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A method of providing an adaptive reference orientation, the method being implemented by a processing unit and comprising:
   repeatedly providing:
   a) receiving first data sensed by one or more sensors, said first data being indicative of a head orientation associated with a user;
   b) prior to the obtaining a new adaptive reference orientation, receiving second data sensed by the one or more sensors, and receiving additional data sensed by one or more sensors, said additional data being indicative of changes of a current frame of reference of the user, said second data comprises said received additional sensed data, said second data being indicative of changes of the current frame of reference of the user;
   c) obtaining said new adaptive reference orientation by moving a current adaptive reference orientation towards said head orientation, by an amount which is varied in accordance with at least said second data;
   d) computing the head orientation relative to said adaptive reference orientation; and
   e) using said new adaptive reference orientation as a current adaptive reference orientation for a next repeat of operations a)-d).

2. The method of claim 1, wherein said amount is varied at least partly in accordance with changes in statistical properties of said second data.

3. The method of claim 1, wherein said new adaptive reference orientation is obtained by rotating said current adaptive reference orientation in accordance with an adjustment amount.

4. The method of claim 3, wherein said second data is used to compute said adjustment amount.

5. The method of claim 3, wherein said rotating is carried out by interpolating between said current adaptive reference orientation and said indicated head orientation.

6. The method of claim 3, wherein said adjustment amount is derived from said second data by computing one or more measures, and converting said one or more measures to said adjustment amount, wherein said one or more measures include one or more of relative stability, relative deviation, absolute deviation.

7. The method of claim 3, wherein said adjustment amount is further processed for at least one of: smoothing, and to control one or more of rise time, hold time, and decay time of said adjustment amount.

8. The method of claim 6, wherein said one or more measures are converted to said adjustment amount by comparing one or more of said one or more measures to one or more respective thresholds.

9. The method of claim 1, wherein said second data comprises data indicative of at least one of: location, motion, orientation, velocity and acceleration associated with the user in at least one dimension of a three dimensional coordinate system.

10. The method of claim 1, further comprising rendering binaural audio in accordance with the head orientation computed relatively to the new adaptive reference orientation.

11. The method of claim 1, further comprising rendering one of virtual reality (VR) video and augmented reality (AR) video in accordance with the head orientation computed relatively to the new adaptive reference orientation.

12. A system of providing an adaptive reference orientation, the system comprising:
   one or more sensors; and
   a processing unit operably coupled to the one or more sensors, the processing unit being configured to repeatedly provide:
   a) receiving first data sensed by at least one of the one or more sensors, the first data being indicative of a head orientation associated with a user;
   b) prior to the obtaining a new adaptive reference orientation, receiving second data sensed by at least one of the one or more sensors, and receiving additional data sensed by at least one of the one or more sensors, said additional data being indicative of changes of a current frame of reference of the user, said second data comprises said received additional sensed data, the second data being indicative of changes of the current frame of reference of the user;
   c) obtaining said new adaptive reference orientation by moving a current adaptive reference orientation towards said head orientation by an amount which is varied in accordance with at least the second data;
   d) computing the head orientation relative to the new adaptive reference orientation; and
   e) using the new adaptive reference orientation as a current adaptive reference orientation for a next repeat of operations a)-d).

13. The system of claim 12, wherein said adjustment amount is derived from said second data by computing one or more measures, and converting said one or more measures to said adjustment amount, wherein said one or more measures include one or more of relative stability, relative deviation, absolute deviation.

14. The system of claim 12, wherein said second data is indicative of at least one of: location, motion, orientation, velocity and acceleration associated with of the user in at least one dimension of a three dimensional coordinate system.

15. The system of claim 12, wherein the processing unit is further configured to provide at least one of: rendering binaural audio in accordance with the head orientation computed relatively to the new adaptive reference orientation, and rendering one of virtual reality (VR) video and augmented reality (AR) video in accordance with the head orientation computed relatively to the new adaptive reference orientation.

16. A non-transitory computer-readable memory tangibly embodying a program of instructions executable by a computer for executing a method of providing an adaptive reference orientation usable for determining a relative head orientation of a user, the method comprising:

repeatedly providing:
- a) receiving first data sensed by one or more sensors, said first data being indicative of a head orientation associated with a user;
- b) prior to the obtaining a new adaptive reference orientation, receiving second data sensed by at least one of the one or more sensors, and receiving additional data sensed by one or more sensors, said additional data being indicative of changes of a current frame of reference of the user, said second data comprises said received additional sensed data, said second data being indicative of changes of the current frame of reference of the user;
- c) obtaining said new adaptive reference orientation by moving a current adaptive reference orientation towards said head orientation, by an amount which is varied in accordance with at least said second data;
- d) computing the head orientation relative to said adaptive reference orientation; and
- e) using said new adaptive reference orientation as a current adaptive reference orientation for a next repeat of operations a)-d).

* * * * *